United States Patent
Aidan

(10) Patent No.: US 12,512,008 B1
(45) Date of Patent: Dec. 30, 2025

(54) INTERACTIVE AI-GENERATED BEAUTY TUTORIAL SYSTEM

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 18/759,132

(22) Filed: Jun. 28, 2024

(51) Int. Cl.
G09B 5/02 (2006.01)
A45D 44/00 (2006.01)
G09B 5/06 (2006.01)

(52) U.S. Cl.
CPC .............. *G09B 5/02* (2013.01); *A45D 44/00* (2013.01); *G09B 5/06* (2013.01)

(58) Field of Classification Search
CPC ............ G09B 5/02; G09B 5/06; A45D 44/00
See application file for complete search history.

(56) References Cited

U.S. PATENT DOCUMENTS

| | | | |
|---|---|---|---|
| 9,812,030 B2* | 11/2017 | Yamanashi | G09B 5/02 |
| 10,251,463 B2* | 4/2019 | Yamanashi | A45D 44/005 |
| 10,606,882 B2* | 3/2020 | Shen | G09B 5/065 |
| 10,607,084 B1* | 3/2020 | Tang | G06T 7/70 |
| 10,672,288 B2* | 6/2020 | Ribeira | G16H 20/10 |
| 10,762,799 B1* | 9/2020 | Yang | G09B 5/06 |
| 10,810,902 B2* | 10/2020 | Besen | A45D 40/18 |
| 10,878,718 B2* | 12/2020 | Mora | G09B 5/00 |
| 11,638,853 B2* | 5/2023 | Yang | G06V 40/23 434/247 |
| 11,907,413 B2* | 2/2024 | Kim | G06V 10/40 |
| 12,134,036 B2* | 11/2024 | Bramlet | H04N 5/265 |
| 2017/0236447 A1* | 8/2017 | Stalling | G09B 19/08 434/157 |
| 2019/0295429 A1* | 9/2019 | McHugh | G09B 19/0038 |
| 2020/0302817 A1* | 9/2020 | Williams | G09B 7/02 |
| 2022/0062130 A1* | 3/2022 | Taylor | A61K 8/362 |
| 2022/0384027 A1* | 12/2022 | Kaleal, III | A61B 5/11 |

OTHER PUBLICATIONS

Loreal, "HAPTA Lancome Innovation" Retrieved from the Internet at:https://www.loreal.com/en/articles/science-and-technology/hapta-lancome-innovation/.

* cited by examiner

*Primary Examiner* — Xuan M Thai
*Assistant Examiner* — Sadaruz Zaman
(74) *Attorney, Agent, or Firm* — MARSHALL, GERSTEIN & BORUN LLP

(57) ABSTRACT

A handheld makeup applicator device is provided, the handheld makeup applicator device comprising: one or more sensors integrated into a housing of the handheld makeup applicator device and operable to capture sensor data during application of a makeup look, using the handheld makeup applicator device, by a user; a communication interface; one or more processors; and one or more non-transitory memories, storing computer-readable instructions that, when executed by the one or more processors, cause the one or more processors to: receive sensor data captured by the one or more sensors during the application of the makeup look by the user; and send, via the communication interface, an indication of the sensor data, captured by the one or more sensors during the application of the makeup look by the user, to a second handheld makeup applicator device associated with a second user.

20 Claims, 7 Drawing Sheets

INTERACTIVE AI-GENERATED BEAUTY TUTORIAL SYSTEM

FIELD OF THE INVENTION

The present invention relates generally to the field of cosmetics and, more specifically, to handheld makeup applicator devices capable of recording techniques used by beauty advisors to apply makeup looks, and handheld makeup applicator devices capable of guiding other users to replicate the makeup looks created by the beauty advisors, utilizing machine learning, artificial intelligence, augmented reality, and other technologies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, many people watch tutorial videos created by beauty advisors (such as makeup artists, influencers, etc.) to learn how to apply various makeup looks on themselves. Individuals may carefully watch as a video of a beauty advisor applying a particular makeup look of interest and then attempt to replicate the steps performed by the beauty advisor in order to recreate the makeup look of the beauty advisor. However, this process often requires trial and error, and often involves significant rewatching and replaying of the video to master the techniques used by the beauty advisor.

SUMMARY

In one aspect, a handheld makeup applicator device is provided. The handheld makeup applicator device may include: one or more sensors integrated into a housing of the handheld makeup applicator device and operable to capture sensor data during application of a makeup look, using the handheld makeup applicator device, by a user; a communication interface; one or more processors; and one or more non-transitory memories, storing computer-readable instructions that, when executed by the one or more processors, cause the one or more processors to: receive sensor data captured by the one or more sensors during the application of the makeup look by the user; and send, via the communication interface, an indication of the sensor data, captured by the one or more sensors during the application of the makeup look by the user, to a second handheld makeup applicator device associated with a second user. The handheld makeup applicator device may include additional, less, or alternate elements, including those discussed elsewhere herein.

In another aspect, a handheld makeup applicator device associated with a user is provided. The handheld makeup applicator device may include: a communication interface; one or more adjustable components integrated a housing of the handheld makeup applicator device; one or more actuators configured to adjust the one or more adjustable components; one or more processors; and one or more non-transitory memories, storing computer-readable instructions that, when executed by the one or more processors, cause the one or more processors to: receive, via the communication interface, from a second handheld makeup applicator device, indications of data captured by a second handheld makeup applicator device during an application of a makeup look by a second user of the second handheld makeup applicator device; and control the one or more actuators to adjust the one or more adjustable components to guide the user of the handheld makeup applicator device to replicate the makeup look applied by the second user of the second handheld makeup applicator device based on the data captured by the second handheld makeup applicator device during the application of the makeup look. The handheld makeup applicator device may include additional, less, or alternate elements, including those discussed elsewhere herein.

In still another aspect, a system for operating one or more handheld makeup applicator devices to allow users to replicate makeup looks created by beauty advisors is provided. The system may include a first handheld makeup applicator device associated with a first user, the first handheld makeup applicator device comprising: one or more sensors integrated into a first housing of the first handheld makeup applicator device and operable to capture sensor data during application of a makeup look, using the first handheld makeup applicator device, by the first user; a first communication interface; a first set of one or more processors; and a first set of one or more non-transitory memories, storing a first set of computer-readable instructions that, when executed by the first set of one or more processors, cause the first set of one or more processors to: receive sensor data captured by the one or more sensors during the application of the makeup look; and send, via the first communication interface, an indication of the sensor data captured by the one or more sensors during the application of the makeup look to a second handheld makeup applicator device associated with a second user. The system may further include the second handheld makeup applicator device associated with the second user, the second handheld makeup applicator device comprising: a second communication interface; one or more adjustable components integrated into a second housing of the second handheld makeup applicator device; one or more actuators configured to adjust the one or more adjustable components; a second set of one or more processors; and a second set of one or more non-transitory memories, storing a second set of computer-readable instructions that, when executed by the second set of one or more processors, cause the second set of one or more processors to: receive, via the second communication interface, from the first handheld makeup applicator device, indications of the sensor data captured by the one or more sensors during the application of the makeup look; and control the one or more actuators to adjust the one or more adjustable components to guide the second user to replicate the makeup look applied by the first user of the first handheld makeup applicator device based on the sensor data captured by the one or more sensors of the first handheld makeup applicator device during the application of the makeup look. The system may include additional, less, or alternate elements, including those discussed elsewhere herein.

In another aspect, a handheld makeup applicator device associated with a user is provided. The handheld makeup applicator device may include a communication interface, one or more sensors integrated into a housing of the handheld makeup applicator device, a user interface, one or more processors; and one or more non-transitory memories, storing computer-readable instructions that, when executed by the one or more processors, cause the one or more processors to: receive, via the communication interface, indications of data captured by a second handheld makeup applicator device during an application of a makeup look by a second user of the second handheld makeup applicator device; and provide, via the user interface, guidance to guide the user of the handheld makeup applicator device to replicate the makeup look applied by the second user of the second handheld makeup applicator device based on the data captured by the second handheld makeup applicator device during the application of the makeup look, and based on sensor data captured by the one or more sensors of the handheld makeup applicator device. The handheld makeup applicator device may include additional, less, or alternate elements, including those discussed elsewhere herein.

In still another aspect, a system for operating one or more handheld makeup applicator devices to allow users to replicate makeup looks created by beauty advisors is provided. The system may include a first handheld makeup applicator device associated with a first user, the first handheld makeup applicator device comprising a first set of one or more sensors integrated into a first housing of the first handheld makeup applicator device and operable to capture sensor data during application of a makeup look, using the first handheld makeup applicator device, by the first user; and a second handheld makeup applicator device associated with a second user, the second handheld makeup applicator device comprising: a second set of one or more sensors integrated into a second housing of the second handheld makeup applicator device; and a user interface configured to provide guidance to guide the second user of the second handheld makeup applicator device to replicate the makeup look, based on the sensor data captured by the first set of one or more sensors of the first handheld makeup applicator device during the application of the makeup look by the first user, and based on sensor data captured by the second set of one or more sensors of the second handheld makeup applicator device as the second user attempts to replicate the makeup look. The system may include additional, less, or alternate elements, including those discussed elsewhere herein.

In another aspect, a handheld makeup applicator device associated with a user is provided. The handheld makeup applicator device may include a communication interface; one or more sensors integrated into a housing of the handheld makeup applicator device; an audio interface; one or more processors; and one or more non-transitory memories, storing computer-readable instructions that, when executed by the one or more processors, cause the one or more processors to: receive, via the communication interface, indications of data captured by a second handheld makeup applicator device during an application of a makeup look by a second user of the second handheld makeup applicator device; and provide, via the audio interface, audio guidance to guide the user of the handheld makeup applicator device to replicate the makeup look applied by the second user of the second handheld makeup applicator device based on the data captured by the second handheld makeup applicator device during the application of the makeup look, and based on sensor data captured by the one or more sensors of the handheld makeup applicator device. The handheld makeup applicator device may include additional, less, or alternate elements, including those discussed elsewhere herein.

In yet another aspect, a system for operating one or more handheld makeup applicator devices to allow users to replicate makeup looks created by beauty advisors is provided. The system may include a first handheld makeup applicator device associated with a first user, the first handheld makeup applicator device comprising a first set of one or more sensors integrated into a first housing of the first handheld makeup applicator device and operable to capture sensor data during application of a makeup look, using the first handheld makeup applicator device, by the first user; and a second handheld makeup applicator device associated with a second user, the second handheld makeup applicator device comprising: a second set of one or more sensors integrated into a second housing of the second handheld makeup applicator device; and an audio interface configured to provide audio guidance to guide the second user of the second handheld makeup applicator device to replicate the makeup look, based on the sensor data captured by the first set of one or more sensors of the first handheld makeup applicator device during the application of the makeup look by the first user, and based on sensor data captured by the second set of one or more sensors of the second handheld makeup applicator device as the second user attempts to replicate the makeup look. The system may include additional, less, or alternate elements, including those discussed elsewhere herein.

In another aspect, a computer-implemented method executed by one or more processors of a handheld makeup applicator device associated with a user is provided. The computer-implemented method may comprise operations including: receiving indications of sensor data captured by one or more sensors of the handheld makeup applicator device; receiving indications of data captured by a second handheld makeup applicator device during an application of a makeup look by a second user of the second handheld makeup applicator device; and providing audio guidance to guide the user of the handheld makeup applicator device to replicate the makeup look applied by the second user of the second handheld makeup applicator device based on the data captured by the second handheld makeup applicator device during the application of the makeup look, and based on the sensor data captured by the one or more sensors of the handheld makeup applicator device as the user attempts to replicate the makeup look. The method may include additional, less, or alternate elements, including those discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein.

Figure 1:
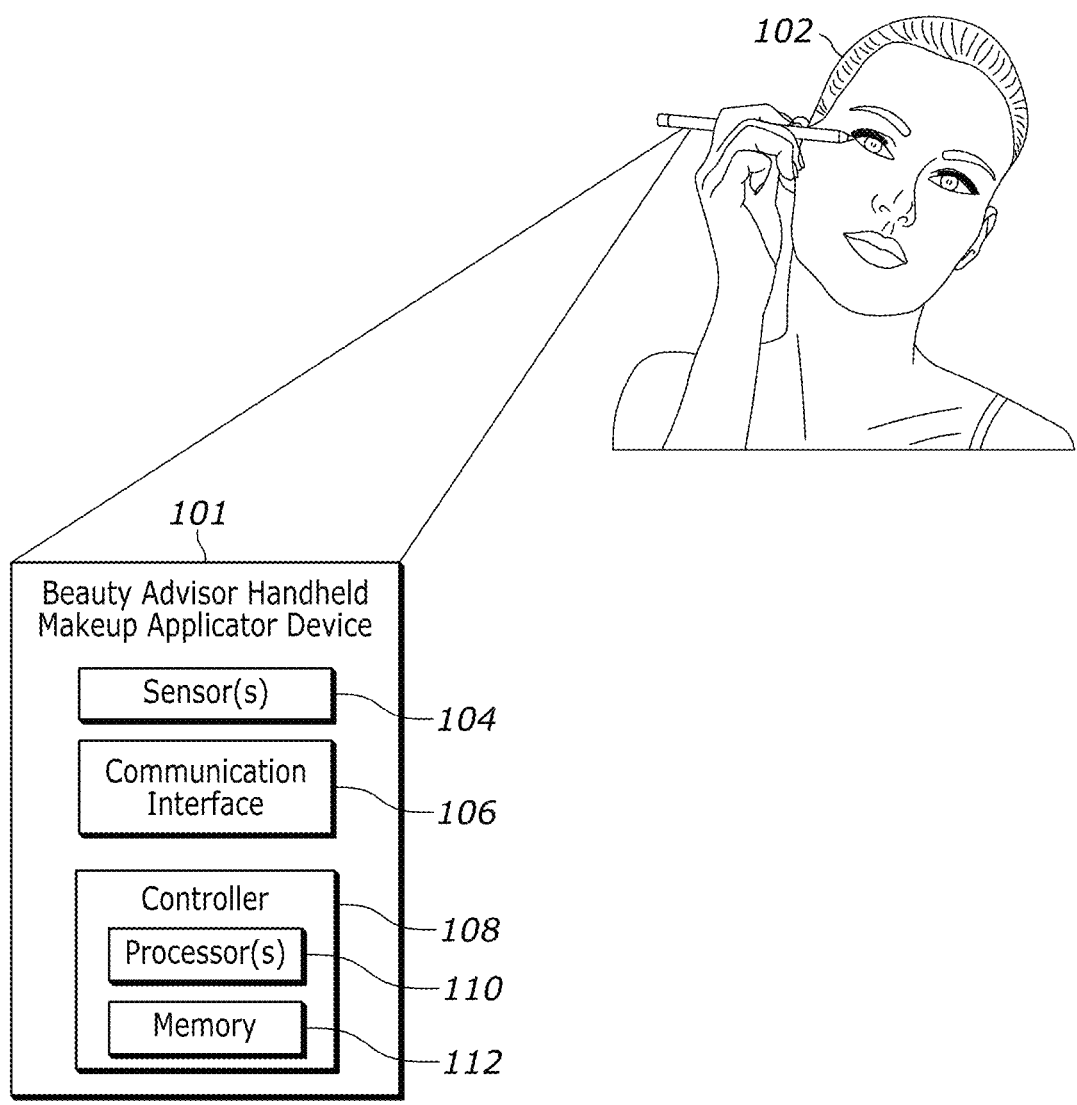
FIG. 1 depicts an exemplary handheld makeup applicator device used by a beauty advisor and configured to capture sensor data as the beauty advisor applies a makeup look, according to some embodiments.

While the systems and methods disclosed herein are susceptible of being embodied in many different forms, they are shown in the drawings and are described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein are not limited in its application to the details of construction and to the arrangements of components set forth above and below, illustrated in the drawings, or as described in the examples.

Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

Overview

The present disclosure provides a system including one or more handheld makeup applicator devices that may be used to allow users to replicate makeup looks created by beauty advisors. The beauty advisors may be makeup artists or influencers, or in some examples, may be friends of the other users. A beauty advisor may create a makeup look and may use the handheld makeup applicator device to apply the makeup look. As the beauty advisor applies the makeup look to his or her face, the handheld makeup applicator device may capture sensor data. This sensor data may be used to generate guidance to allow other users to apply the same makeup look to their own faces. The sensor data captured by the handheld makeup applicator device of the beauty advisor, or the guidance generated therefrom, may be sent to another handheld makeup applicator device, which may in turn provide guidance to allow the user of the other handheld makeup applicator device to apply the makeup look created by the beauty advisor.

Example Handheld Makeup Applicator Device Used by a Beauty Advisor and Configured to Capture Sensor Data as the Beauty Advisor Applies a Makeup Look FIG. 1 depicts an exemplary handheld makeup applicator device 101 associated with a beauty advisor 102. Generally speaking, the beauty advisor 102 may create makeup looks and may use one or more handheld makeup applicator devices 101 to apply the makeup looks. As the beauty advisor applies various makeup looks using the handheld makeup applicator device(s) 101, the handheld makeup applicator devices 101 may capture sensor data associated with the beauty advisor's application of the makeup looks. The sensor data, or guidance generated based on the sensor data, may be sent to respective handheld makeup applicator devices associated with users (discussed in greater detail with respect to FIG. 2 below), and may be used to assist users who wish to replicate the makeup looks created by the beauty advisor.

In some examples, the handheld makeup applicator device 101 may be a handheld makeup applicator device incorporating some or all of the components and/or functionality as described in U.S. patent application Ser. No. 18/591,508, which is incorporated by reference herein.

The handheld makeup applicator device 101 may include one or more sensors 104 integrated into a housing of the handheld makeup applicator device 101, a communication interface 106, and a controller 108 including one or more processors 110 and one or more memories 112.

In some examples, the one or more sensors 104 may include one or more image sensors configured to capture images of the face of the beauty advisor 102 as the beauty advisor 102 applies a makeup look. For instance, these images may be analyzed in order to generate a three-dimensional map associated with the face of the beauty advisor 102 and identify the locations of one or more facial features (e.g., eyes, eyelids, eyebrows, eyelashes, cheeks, cheekbones, nose, lips, chin, etc.) of the face of the beauty advisor 102 on the three-dimensional map.

Furthermore, in some examples, the one or more sensors 104 may include one or more image sensors configured to capture images of cosmetic products, or the packaging thereof, used by the beauty advisor 102 in the makeup look. For instance, the image data associated with the packaging of the various cosmetic products may be analyzed to identify respective cosmetic products based on their packaging. For instance, recognition techniques may be used to identify a likely type of cosmetic product and/or likely properties associated with the cosmetic product based on the image. Moreover, in some examples, this analysis may include analyzing an image of the cosmetic product packaging using optical character recognition techniques to identify one or more letters, numbers, words, codes, etc., on the cosmetic product packaging, and accessing a database associated with cosmetic products to match any identified letters, numbers, words, codes, etc., on the cosmetic product packaging with particular cosmetic products and/or particular properties associated therewith. As another example, this analysis may include analyzing an image of the cosmetic product packaging to identify and/or decode a barcode, QR code, etc. For instance, the payload of the barcode, QR code, etc., may include an identification or indication of the cosmetic product and/or properties associated therewith.

Moreover, in some examples, the one or more sensors 104 may include one or more position and/or motion sensors (e.g., depth sensors, accelerometers, gyroscopes, etc.) configured to capture data representative of the location(s) of the handheld makeup applicator device 101 with respect to the face (or one or more particular facial features) of the beauty advisor 102 as the beauty advisor 102 applies the makeup look, and/or the motion(s)/movement(s) of the handheld makeup applicator device 101 with respect to the face (or one or more particular facial features) of the beauty advisor 102 as the beauty advisor 102 applies the makeup look. Furthermore, in some examples, the one or more sensors 104 may include one or more proximity sensors configured to capture data indicating the proximity of the handheld makeup applicator device 101 to the face (or one or more particular facial features) of the beauty advisor 102 as the beauty advisor 102 applies the makeup look.

Additionally, in some examples, the one or more sensors 104 may include one or more touch sensors configured to capture data representative of instances at which (and/or durations during which) the beauty advisor 102 touches the handheld makeup applicator device 101 with his or her hands or fingers and/or instances at which (and/or durations during which) the handheld makeup applicator device 101 touches the face (or one or more particular facial features) of the beauty advisor 102 as the beauty advisor 102 applies the makeup look. Moreover, in some examples, the one or more sensors 104 may include one or more pressure sensors configured to capture data indicating the pressure with which the beauty advisor 102 holds the handheld makeup applicator device 101 and/or the pressure with which the handheld makeup applicator device 101 is applied to the face (or one or more particular facial features) of the beauty advisor 102 as the beauty advisor 102 applies the makeup look.

Furthermore, in some examples, the handheld makeup applicator device 101 may include one or more automatic components (e.g., applicator heads configured to automatically apply some or all of the makeup look via one or more actuators and/or motors of the handheld makeup applicator device). To the extent that these applicator heads are controlled or adjusted by the beauty advisor 102 (e.g., via a user interface of the handheld makeup applicator device 101, or one or more physical buttons or other adjustors) as the beauty advisor 102 applies the makeup look, the one or more sensors 104 may capture data associated with instances at which (and ways in which) the beauty advisory controls or adjusts the automatic components as the beauty advisor 102 applies the makeup look. Moreover, in some examples, the applicator heads may be interchangeable. To the extent that the applicator heads are exchanged as the beauty advisor 102 applies the makeup look, the one or more sensors 104 may capture data associated with instances at which the applicator heads are exchanged for one another, i.e., including an indication of an initial applicator head and a new applicator head.

In some examples, the one or more sensors 104 may capture and/or store (e.g., in the memories 112) any of the data discussed above in a time-series over the duration of the application of the makeup look or over the duration of particular steps of the application of the makeup look. The stored sensor data may include indications of actions performed simultaneously at particular times over the duration of the application of the makeup look or over the duration of particular steps of the application of the makeup look. For instance, the stored sensor data may include an indication of a location of the handheld makeup applicator device 101 with respect to the face or a particular facial feature of the beauty advisor 102 and an amount of pressure applied at a particular time during the application of the makeup look. As another example, the stored sensor data may include indication of a motion or movement of the handheld makeup applicator device with respect to the face or a particular facial feature of the beauty advisor 102 and an indication of an image of a particular cosmetic product applied by the handheld makeup applicator device to the face or a particular facial feature of the beauty advisor 102 as the motion or movement is performed. Many other combinations of the data discussed above may be captured and/or stored by the one or more sensors 104.

The communication interface 106 may be configured to communicate with various other devices, including other handheld makeup applicator devices associated with other users, various user devices associated with the beauty advisor 102 or other users, various servers, various databases, etc., via various networks, as discussed in greater detail below with respect to FIG. 3.

The memories 112 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memories 222 may store an operating system (OS) (e.g., iOS, Microsoft Windows, Linux, UNIX, etc.) capable of facilitating the functionalities, apps, methods, or other software as discussed herein.

Generally speaking, the memories 112 may store instructions that, when executed by the processor(s) 110, cause the controller 108 to control the one or more sensors 104 to capture data as the beauty advisor 102 applies a makeup look to his or her face (or, in some cases, as the beauty advisor 102 applies a makeup look to another person's face). In some examples, the beauty advisor 102 may provide user input to the handheld makeup applicator device 101 directly (may provide user input to another device in communication with the handheld makeup applicator device via the communication interface 106), indicating when the beauty advisor 102 is starting to apply a makeup look and indicating when the makeup look is complete, or indicating that the beauty advisor 102 is starting to apply a particular step of the makeup look and indicating when the particular step of the makeup look is complete. In such examples, the memories 112 may store instructions that, when executed by the processor(s) 110, cause the controller 108 to receive the input from the user and control the one or more sensors 104 to begin capturing data when the beauty advisor 102 begins applying the makeup look (or the particular step of the makeup look) and to stop capturing data when the beauty advisor stops applying the makeup look (or the particular step of the makeup look). Furthermore, the memories 112 may store instructions that, when executed by the processor(s) 110, cause the controller 108 to store the data captured by the one or more sensors 104 for each makeup look or for each step of the makeup look, e.g., in the memories 112 (or in one or more databases discussed with respect to FIG. 3). Additionally, in some examples, the memories 112 may store instructions that, when executed by the processor(s) 110, cause the controller 108 to send the data captured by the one or more sensors 104 for each makeup look or for each step of the makeup look, to various other devices (directly or indirectly) via the communication interface 106, including other handheld makeup applicator devices associated with other users, various user devices associated with the beauty advisor 102 or other users, various servers, various databases, etc., via various networks, as discussed in greater detail below with respect to FIG. 3.

Figure 2:
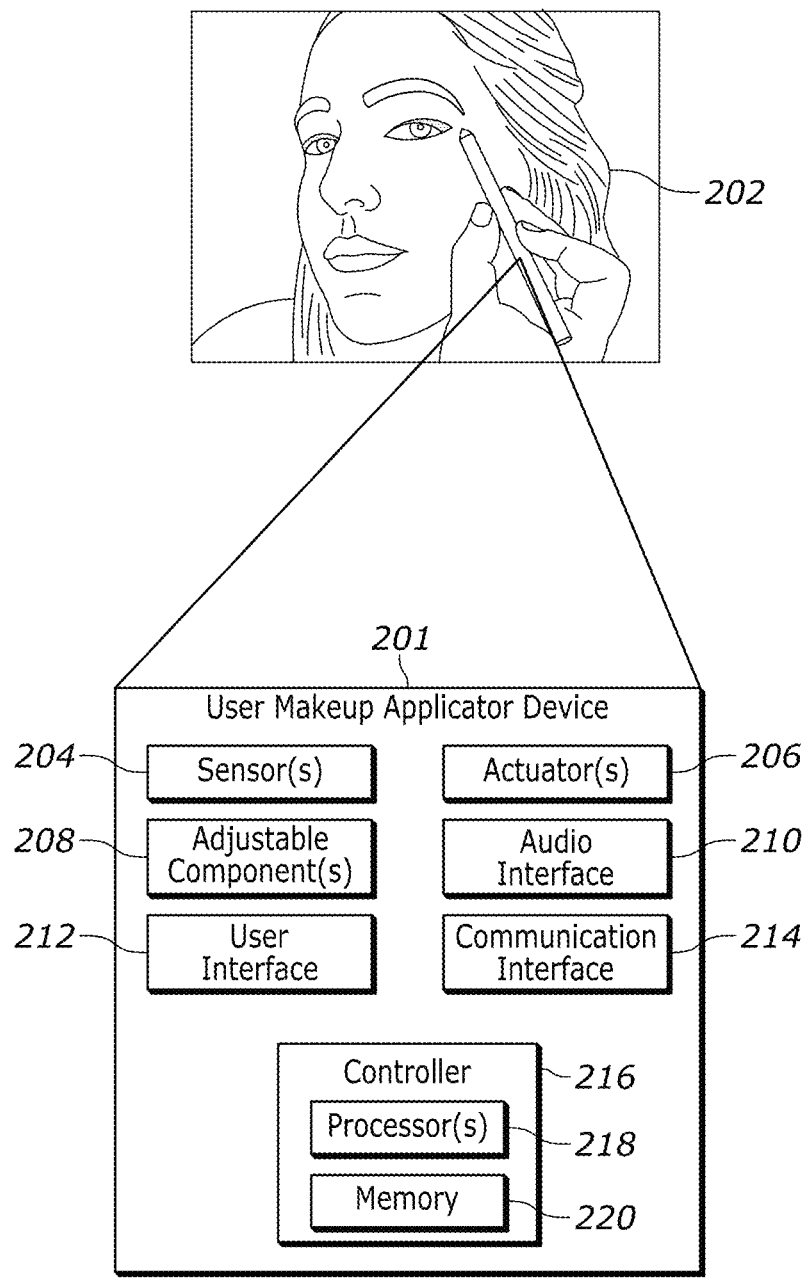
FIG. 2 depicts an exemplary handheld makeup applicator device configured to provide guidance to a user to replicate the makeup look created by a beauty advisor, according to some embodiments.

Example Handheld Makeup Applicator Device Configured to Provide Guidance to a User to Replicate the Makeup Look Created by a Beauty Advisor FIG. 2 depicts an exemplary handheld makeup applicator device 201 associated with a user 202. Generally speaking, the handheld makeup applicator device 201 may provide guidance to the user 202 as the user 202 attempts to replicate a makeup look created by a beauty advisor 102. In some examples, the guidance provided by the handheld makeup applicator device 201 may be generated based on both the sensor data captured by the handheld makeup applicator device 101 associated with the beauty advisor 102 as the beauty advisor 102 applies the makeup look, and sensor data captured by the handheld makeup applicator device 201 as the user 202 attempts to replicate the makeup look created/applied by the beauty advisor 102.

In some examples, the handheld makeup applicator device 201 may be a handheld makeup applicator device incorporating some or all of the components and/or functionality as described in U.S. patent application Ser. No. 18/591,508.

Moreover, in some examples, the handheld makeup applicator device 101 and the handheld makeup applicator device 201 may be different types of devices, with different components, features, etc., while in other examples, the handheld makeup applicator device 101 and the handheld makeup applicator device 201 may be essentially identical devices configured to operate in different modes (e.g., beauty advisor mode, as described with respect to the handheld makeup applicator device 101, or user mode, as described with respect to the handheld makeup applicator device 201).

The handheld makeup applicator device 201 may include one or more sensors 204 integrated into a housing of the handheld makeup applicator device 201, one or more actuators 206 (and/or motors) configured to adjust one or more adjustable components 208 integrated into the housing of the handheld makeup applicator device 201, an audio interface 210, a user interface 212, a communication interface 214, and/or a controller 216 including one or more processors 218 and one or more memories 220.

In some examples, the one or more sensors 204 may include one or more image sensors configured to capture images of the face of the user 202. For instance, these images may be analyzed in order to generate a three-dimensional map associated with the face of the user 202 and identify the locations of one or more facial features (e.g., eyes, eyelids, eyebrows, eyelashes, cheeks, cheekbones, nose, lips, chin, etc.) of the face of the user 202 on the three-dimensional map. In particular, the one or more images may be captured as the user 202 attempts to replicate a makeup look of the beauty advisor 102. Furthermore, in some examples, the one or more images may be include images of cosmetic products used by the user 202 as the user 202 attempts to replicate makeup look of the beauty advisor 102, or the packaging of such cosmetic products (which may be analyzed to identify such products, as discussed above with respect to FIG. 1).

Moreover, in some examples, the one or more sensors 204 may include one or more position and/or motion sensors (e.g., depth sensors, accelerometers, gyroscopes, etc.) configured to capture data representative of the location(s) of the handheld makeup applicator device 201 with respect to the face (or one or more particular facial features) of the user 202 as the user 202 attempts to replicate the makeup look of the beauty advisor 102, and/or the motion(s)/movement(s) of the handheld makeup applicator device 101 with respect to the face (or one or more particular facial features) of the user 202 as the user 202 attempts to replicate the makeup look of the beauty advisor 102. Furthermore, in some examples, the one or more sensors 204 may include one or more proximity sensors configured to capture data indicating the proximity of the handheld makeup applicator device 201 to the face (or one or more particular facial features) of the user 202 as the user 202 attempts to replicate the makeup look of the beauty advisor 102.

Additionally, in some examples, the one or more sensors 204 may include one or more touch sensors configured to capture data representative of instances at which (and/or durations during which) the user 202 touches the handheld makeup applicator device 201 with his or her hands or fingers and/or instances at which (and/or durations during which) the handheld makeup applicator device 201 touches the face (or one or more particular facial features) of the user 202 as the user 202 attempts to replicate the makeup look of the beauty advisor 102. Moreover, in some examples, the one or more sensors 104 may include one or more pressure sensors configured to capture data indicating the pressure with which the beauty advisor 102 holds the handheld makeup applicator device 101 and/or the pressure with which the handheld makeup applicator device 101 is applied to the face (or one or more particular facial features) of the user 202 as the user 202 attempts to replicate the makeup look of the beauty advisor 102.

The one or more actuators 206 (and/or motors) may be configured to adjust the one or more adjustable components 208 integrated into the housing of the handheld makeup applicator device 201 in order to assist and/or guide the user 202 to replicate the makeup look of the beauty advisor 102. For instance, the adjustable components 208 may include various adjustable applicator heads (e.g., as shown discussed in U.S. patent application Ser. No. 18/591,508) configured to mechanically move to assist and/or guide the user 202 to replicate the makeup look of the beauty advisor 102.

For instance, the one or more actuators 206 may be operable to, in conjunction with one or more motors, automatically move and/or adjust the one or more adjustable components 208, such as one or more adjustable applicator heads, based on commands/instructions provided by the controller 216. For example, an applicator head may include a brush for applying blush or other powder or cream based cosmetic products, a wand or spoolie brush for applying mascara, eyebrow tint, eyebrow gel, or other cosmetic products, a lipstick tube, crayon, or pencil for applying lipstick, lip gloss, lip tint, eyeshadow, eyeliner, or other cosmetic products, etc. For instance, in various embodiments, the applicator heads may include a sponge applicator head, a puff applicator head, a pencil applicator head, a felt tip applicator head, a marker applicator head, a crayon applicator head, a lip stick applicator head, a lip gloss applicator head, a roller applicator head, etc., or any other suitable applicator head for applying a cosmetic product. In some examples, these adjustable applicator heads may be interchangeable, and the housing of the handheld makeup applicator device 201 may be configured such that one of the interchangeable applicator heads may be attached to the housing, and may be subsequently removed from the housing by a user, and replaced with another of the interchangeable applicator heads.

The one or more actuators 206 and/or the one or more motors may automatically move and/or adjust the or more components 208 in real-time as a user 202 holds the handheld makeup applicator 201 to the face of the user 202 to apply a cosmetic product to recreate or replicate the makeup look of the beauty advisor 102. For instance, the one or more actuators 206 and/or the one or more motors may automatically spin and/or twist the or more adjustable components 208, and/or may move the one or more components 208 laterally, vertically, or in other directions with respect to the face of the user 202 to apply the cosmetic product in a particular pattern or shape, and/or to increase or decrease pressure as the cosmetic product is applied.

Moreover, in some examples, the adjustable components 208 may include haptic feedback components configured to vibrate, provide pressure, or otherwise provide feedback to assist and/or guide the user 202 to replicate the makeup look of the beauty advisor 102.

The audio interface 210 may be configured to receive audio inputs from the user 202 as the user 202 attempts to replicate the makeup look of the beauty advisor 102. Furthermore, the audio interface 210 may be configured to provide audio guidance to the user 202 as the user 202 attempts to replicate the makeup look of the beauty advisor 102.

The user interface 212 may be configured to receive inputs from the user 202 (e.g., selections made via physical buttons, a touchscreen display, a keyboard, etc.) associated with the user 202 attempting to replicate the makeup look of the beauty advisor 102. Furthermore, the user interface 212 may be configured to provide visual guidance to the user 202 as the user attempts to replicate the makeup look of the beauty advisor 102.

The communication interface 214 may be configured to communicate with various other devices, including other handheld makeup applicator devices (such as the handheld makeup applicator device 101 associated with the beauty advisor 102), various user devices associated with the user 202 or other users, various servers, various databases, etc., via various networks, as discussed in greater detail below with respect to FIG. 3.

The memories 220 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memories 222 may store an operating system (OS) (e.g., iOS, Microsoft Windows, Linux, UNIX, etc.) capable of facilitating the functionalities, apps, methods, or other software as discussed herein.

Generally speaking, the memories 220 may store instructions that, when executed by the processor(s) 218, cause the controller 216 to receive, via the communication interface 214, an indication of sensor data captured by the sensors 104 of the handheld makeup applicator device 101 associated with the beauty advisor 102 during the application of the makeup look, and/or guidance for replicating the makeup look generated based on the sensor data captured by the sensors 104 of the handheld makeup applicator device 101 associated with the beauty advisor 102 during the application of the makeup look. The communication interface 214 may receive the indication of the sensor data and/or the guidance directly from the handheld makeup applicator device 101, or from one or more servers, user devices, databases, etc., via various networks, as discussed in greater detail below with respect to FIG. 3.

Furthermore, the memories 220 may store instructions that, when executed by the processor(s) 218, cause the controller 216 to provide the guidance for replicating the makeup look of the beauty advisor 102. In some examples, the controller 216 may provide the guidance as a series of steps, and upon determining that the user 202 or the device 201 has completed a step (e.g., based on analyzing the data captured by the sensors 204), may provide guidance associated with a subsequent step until the makeup look is complete.

In some examples, the controller 216 may control the actuators 206 to adjust the adjustable components 208 to mechanically move various portions of the handheld makeup applicator device 201, in real-time as the user holds the handheld makeup applicator device 201 to the face of the user 202, in accordance with the guidance for replicating the makeup look on the face of the user 202.

For example, when, for instance, a lipstick applicator head of the handheld makeup applicator device 201 is close to or touching the lips of the face of the user 202 (i.e., as determined by the controller 216 based on sensor data captured by the sensors 204), the instructions stored on the memories 220 may cause the controller 216 to control the lipstick applicator head to apply pressure in real-time as the user 202 moves the handheld makeup applicator device 201 across the lips of the user 202, in order to apply lipstick in accordance with a makeup look of the beauty advisor 102 that includes lipstick. In particular, the instructions stored on the memories 220 may cause the controller 216 to control the lipstick applicator head to apply a same or similar amount of pressure as the beauty advisor 102 applied when applying the lipstick during the original makeup look applied by the beauty advisor 102 using the handheld makeup applicator device 101.

As another example, when, for instance, a mascara wand applicator head of the handheld makeup applicator device 201 is close to or touching the eyelashes of the face of the user 202 (i.e., as determined by the controller 216 based on sensor data captured by the sensors 204), the instructions stored on the memories 220 may cause the controller 216 to control the mascara wand applicator head to slowly spin or stroke in a vertical direction in real-time as the user 202 moves the handheld makeup applicator device 201 over the eyelashes of the user 202, in order to apply mascara in accordance with a makeup look of the beauty advisor 102 that includes mascara. In particular, the instructions stored on the memories 220 may cause the controller 216 to control the mascara applicator head to apply a same or similar amount of spin or lift, and/or a similar number of coats of mascara, as the beauty advisor 102 applied when applying the mascara during the original makeup look applied by the beauty advisor 102 using the handheld makeup applicator device 101.

As still another example, when, for instance, an eyeliner applicator head of the handheld makeup applicator device 201 is close to or touching the edge of the eyelid of the user 202 (i.e., as determined by the controller 216 based on sensor data captured by the sensors 204), the instructions stored on the memories 220 may cause the controller 216 to control the eyeliner applicator head to adjust the eyeliner applicator head vertically or laterally in real-time as the user 202 moves the handheld makeup applicator device 201 over the eyelid of the user 202, in order to apply eyeliner in accordance with in accordance with a makeup look of the beauty advisor 102 that includes eyeliner. In particular, the instructions stored on the memories 220 may cause the controller 216 to control the eyeliner applicator head using a same or similar vertical or lateral adjustment as the beauty advisor 102 applied when applying the eyeliner during the original makeup look applied by the beauty advisor 102 using the handheld makeup applicator device 101.

Furthermore, in some examples the controller 216 may control the actuators 206 to adjust the adjustable components 208 to provide haptic guidance for replicating the makeup look on the face of the user 202, in real-time as the user 202 holds the handheld makeup applicator device 201 to the face of the user 202, to cause the user 202 to hold or move the handheld makeup applicator device 201 in accordance with the makeup look of the beauty advisor 102.

For instance, the instructions stored on the memories 220 may cause the controller 216 to compare the sensor data captured by the sensors 204 of the handheld makeup applicator device 201 as the user 202 applies the makeup look (or a step of the makeup look) to the sensor data captured by the sensors 104 of the handheld makeup applicator device 101 as the beauty advisor 102 applied the makeup look (or the step of the makeup look), and control a haptic feedback component to provide different feedback based on the results of the comparison. For example, the instructions stored on the memories 220 may cause the controller 216 to control the haptic feedback component one type of haptic feedback (or to not provide haptic feedback) when the placement and/or movement of the handheld makeup applicator device 201 is in accordance with the makeup look of the beauty advisor 102, and to provide another type of haptic feedback (or to provide haptic feedback) when the placement and/or movement of the handheld makeup applicator device 201 is not in accordance with the makeup look of the beauty advisor 102. As another example, the instructions stored on the memories 220 may cause the controller 216 to control a haptic feedback component located on one location of a housing of the handheld makeup applicator device 201 to provide haptic feedback to indicate that the user 202 should start (or stop) moving the handheld makeup applicator device 201 in that direction, in accordance with the makeup look of the beauty advisor 102.

Moreover, in some examples, the controller 216 may control the audio interface 210 to receive audio feedback from the user 202, and/or provide audio guidance to the user 202 for replicating the makeup look. For instance, the instructions stored on the memories 220 may cause the controller 216 to control the audio interface 210 to receive audio inputs from the user 202 (e.g., via a microphone or other audio sensor) as the user 202 attempts to replicate the makeup look of the beauty advisor 102. For instance, the user 202 may use vocalizations to verbally indicate when he or she is starting to attempt to replicate the makeup look of the beauty advisor 102 (e.g., "OK, I'm starting the makeup look now"), and/or when he or she is starting a particular step of the makeup look of the beauty advisor 102 (e.g., "Starting the eyeliner step now," or "starting step two now").

Furthermore, the audio interface 210 may be configured to provide audio guidance to the user 202 as the user 202 attempts to replicate the makeup look of the beauty advisor 102. For instance, the audio interface 210 may provide audio guidance about particular steps of the makeup look (e.g., "Now put blush on the brush and apply the brush to your cheekbones") or particular movements needed by the user 202 to achieve makeup look (e.g., "Apply light pressure in a circular motion"). Moreover, the controller 216 may control the audio interface 210 to modify the audio guidance based on data captured by the sensors 204 as the user 202 attempts to replicate the makeup look of the beauty advisor 102. For example, based on sensor data from the sensors 204 indicating a pressure level the user 202 is applying using a lipstick applicator of the handheld makeup applicator device 201, and based on comparing that pressure level to a pressure level applied by the beauty advisor 102 when the beauty advisor 102 originally applied lipstick using the handheld makeup applicator device 101 during the initial application of the makeup look, the controller 216 may control the audio interface 210 to provide audio guidance indicating that the user 202 should decrease or increase the applied pressure in accordance with the makeup look of the beauty advisor 102.

Figure 4A:
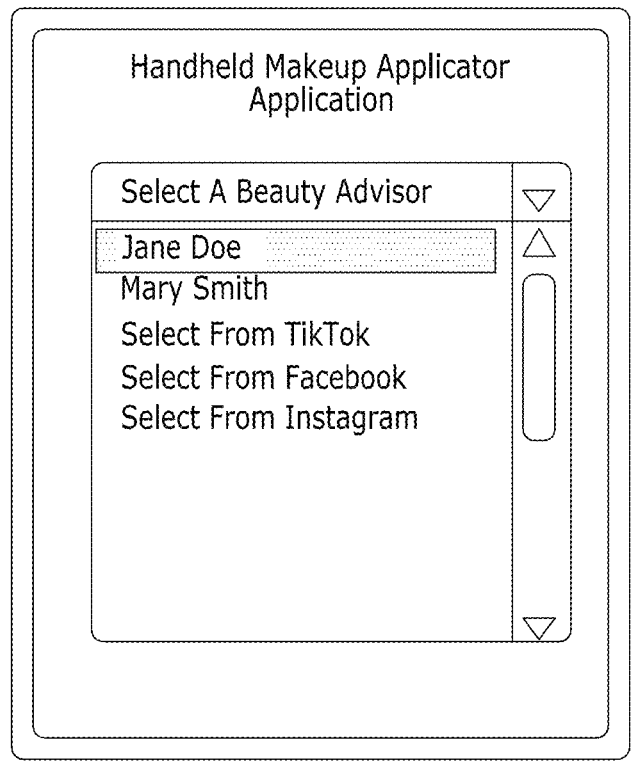
FIGS. 4A-4C depict examples of displays as may be provided by a user interface associated with one or more handheld makeup applicator devices, according to some embodiments.
Figure 4B:
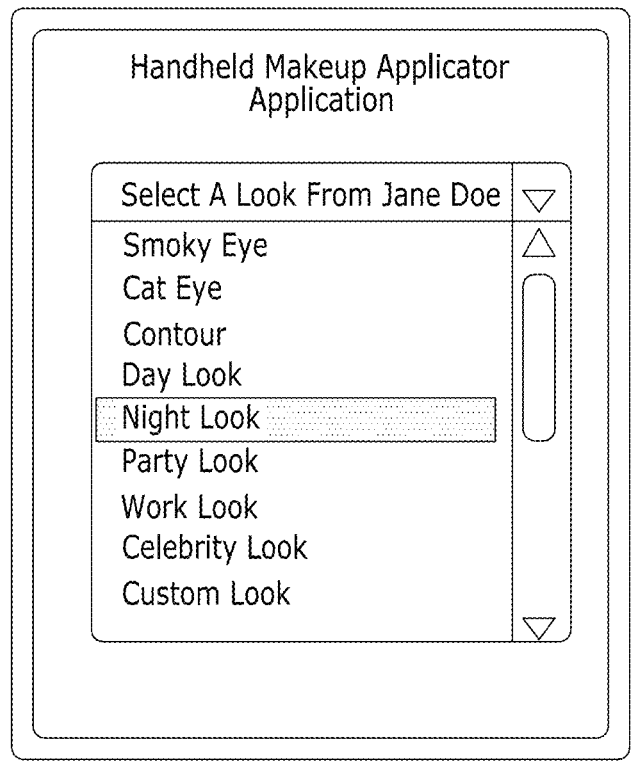

Moreover, in some examples, the controller 216 may control the user interface 212 to receive input from the user 202, and/or to provide visual guidance to the user 202 for replicating the makeup look. For instance, in some examples, as discussed below with respect to FIGS. 4A-4C, the user 202 may select a particular beauty advisor 102 (e.g., as shown at FIG. 4A) or a particular makeup look created by that beauty advisor 102 (e.g., as shown at FIG. 4B). Furthermore, the user interface 212 may be configured to provide displays to the user 202. For instance, these displays may include visual guidance for replicating the makeup look of the beauty advisor 102, or visual guidance for particular steps of the makeup look of the beauty advisor 102. For instance, the visual guidance may include textual guidance, or illustrated guidance. In some examples, the illustrated guidance may illustrate, for instance, a visualization of techniques such as motions, brushstrokes, etc., for applying cosmetic products to achieve the makeup look of the beauty advisor 102. Moreover, in some examples, the illustrated guidance may illustrate, for instance, a visualization of locations on a face (e.g., on a generic face, on an image of the face of the beauty advisor 102, and/or or on an image of the face of the user 202) where one or more cosmetic products are to be applied to achieve the makeup look of the beauty advisor 102, and/or a visualization of how such a face will appear when the makeup look (or a particular step of the makeup look) is complete. In some examples, this visualization may be a three-dimensional visualization. Moreover, in some examples, this visualization may be an augmented reality (AR) visualization overlaid upon a video of the face of the user 202, or the face of the user 202 as reflected in a mirror, in real time.

For instance, the instructions stored on the memories 220 may cause the controller 216 to compare the sensor data captured by the sensors 204 of the handheld makeup applicator device 201 as the user 202 applies the makeup look (or a step of the makeup look) to the sensor data captured by the sensors 104 of the handheld makeup applicator device 101 as the beauty advisor 102 applied the makeup look (or the step of the makeup look), and control the user interface 212 to provide different feedback based on the results of the comparison. For instance, the visualization may be modified based on any modifications required based on the data captured by the sensors 204. As an example, based on sensor data indicating that the packaging of a cosmetic product used by the user is not the same cosmetic product used by the beauty advisor 102 during the application of the makeup look, the visualization may include text describing the correct cosmetic product, or an image of the correct cosmetic product, used in the makeup look of the beauty advisor 102.

Furthermore, in some examples, the memories 220 may store instructions that, when executed by the processor(s) 218, cause the processor(s) 218 to detect whether a particular applicator head is attached to the housing of the handheld makeup applicator device 201, and, in some cases, to provide a prompt via a user interface 212 of the handheld makeup applicator device 201, or via the user interface 308 of the user device 302, for the user to attach a particular applicator head associated with the makeup look of the beauty advisor 102, or a particular step of the makeup look of the beauty advisor 102.

Additionally, in some examples, the memories 220 may store instructions that, when executed by the processor(s) 218, cause the controller 216 to control the one or more sensors 204 to capture data as user 202 attempts to replicate the makeup look of the beauty advisor 102. Furthermore, in some examples, the controller 216 may cause the actuators 206, adjustable components 208, audio interface 210, and/or user interface 212 to adjust or modify the guidance based on the data captured by the one or more sensors 204. For instance, the controller 216 may adjust or modify the guidance based on sensor data associated with the specific contours of the face of the user 202 and the locations, sizes, shapes, etc., of the facial features of the user 202. That is, the guidance may be modified to reflect the face of the user 202 and any differences between the face of the user 202 and the face of the beauty advisor 102. Moreover, the controller 216 may adjust or modify the guidance provided by these various components and interfaces in real time as the user 202 attempts to replicate the makeup look. For instance, if the user 202 is performing a step of the makeup look incorrectly, the controller 216 may adjust or modify the guidance to include one or more corrective actions (e.g., to correct incorrectly applied cosmetic products, and/or to correct an incorrect motion, position, amount of pressure, etc.).

Example System

Figure 3:
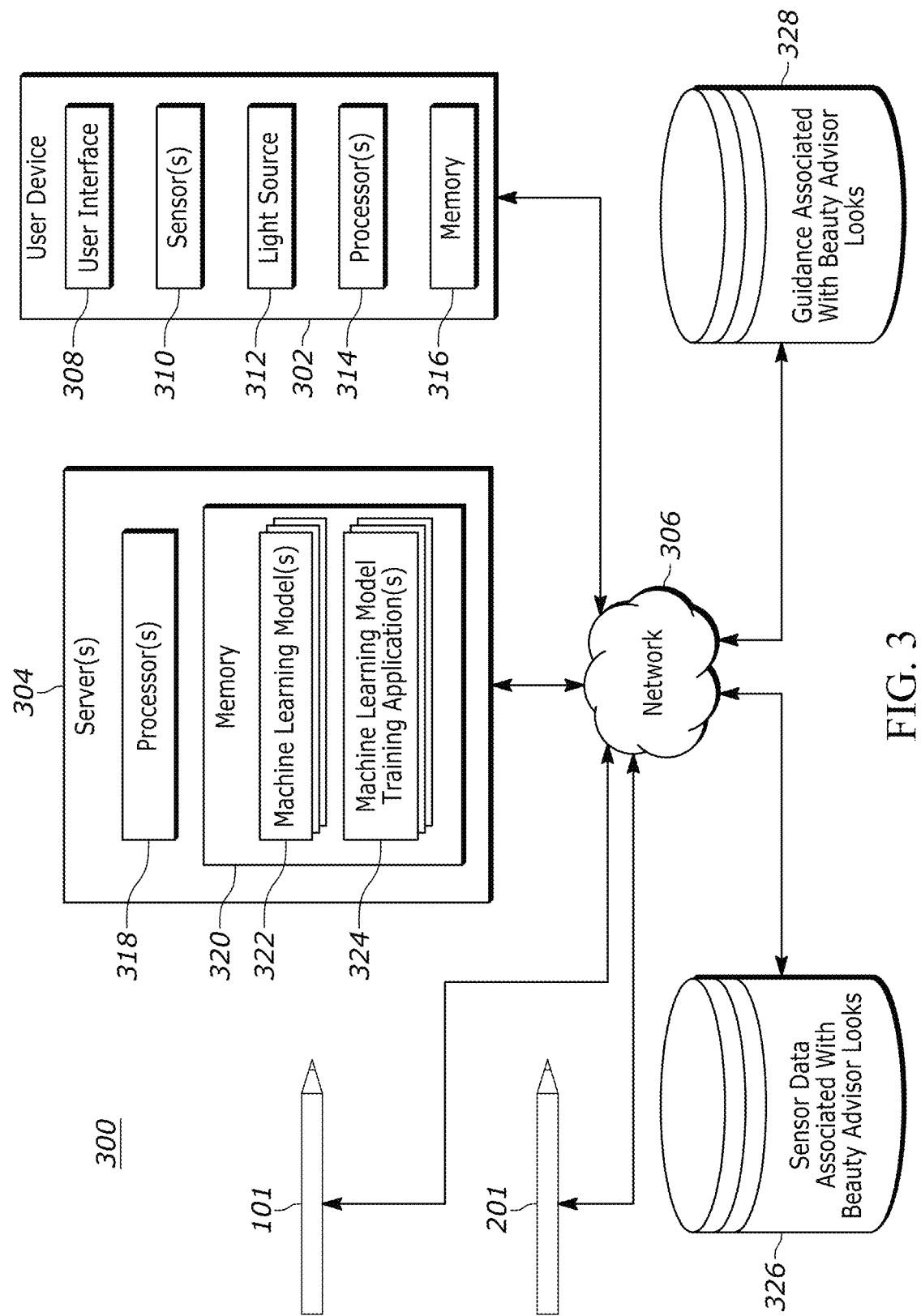
FIG. 3 depicts an exemplary computer system associated with operating one or more handheld makeup applicator devices to allow users to replicate makeup looks created by beauty advisors, according to some embodiments.

FIG. 3 depicts an exemplary computer system 300 for operating one or more handheld makeup applicator devices to allow users to replicate makeup looks created by beauty advisors, according to one embodiment. The high-level architecture illustrated in FIG. 3 may include both hardware and software applications, as well as various data communications channels for communicating data between the various hardware and software components, as is described below.

The system 300 may include a handheld makeup applicator device 101 associated with a beauty advisor 102 and a handheld makeup applicator device 201 associated with another user 202, as well as, in some cases, one or more user computing devices 302 (which may include, e.g., smart phones, smart watches or fitness tracker devices, tablets, laptops, virtual reality headsets, smart or augmented reality glasses, wearables, etc.), and/or one or more server(s) 304. The handheld makeup applicator device 101, handheld makeup applicator device 201, user device(s) 302, and/or server(s) 304 may be operable to communicate with one another via a wired or wireless computer network 306, and/or via short range signals, such as BLUETOOTH signals.

Although two handheld makeup applicator devices 101 and 201, one user device 302, one server 304, and one network 306 are shown in the system 300 of FIG. 3, any number of such handheld makeup applicator devices 101 and 201, user devices 302, servers 304, and networks 306 may be included in various embodiments. Moreover, in some embodiments, the system 300 may include additional and/or alternative devices, such as the robotic cosmetic application device discussed in U.S. patent application Ser. No. 18/433,724 (e.g., configured to replicate the makeup look of the beauty advisor 102, in place of the handheld makeup applicator device 201), the intelligent cosmetic compact device discussed in U.S. patent application Ser. No. 18/444,343 (e.g., configured to serve as an additional or alternative user device 302, and/or to provide guidance in addition to or in place of the handheld makeup applicator device 201), the intelligent mirror device discussed in U.S. patent application Ser. No. 18/444,382 (e.g., configured to provide guidance in addition to or in place of the handheld makeup applicator device 201), and/or the HUD device discussed in U.S. patent application Ser. No. 18/624,361 (e.g., configured to provide guidance in addition to or in place of the handheld makeup applicator device 201), each of which are incorporated by reference herein. To facilitate communications between the various devices of the system 300, each device may each respectively comprise a wireless transceiver to receive and transmit wireless communications.

The user device 302 may include, or may be operable to communicate with, a user interface 308, which may receive input from users and may provide audible or visible output to users in a similar manner as discussed above with respect to the user interfaces of the handheld makeup applicator device 101 and/or the handheld makeup applicator device 201. Furthermore, the user device 302 may include, or may be operable to communicate with, one or more respective sensors 310, which may include similar sensors and/or sensor functionality as discussed above with respect to the sensors 104 of the handheld makeup applicator device 101 and/or the sensors 204 of the handheld makeup applicator device 201. Additionally, the user device 302 may include, or may be operable to communicate with one or more light sources 312 operable to provide light to the face of the user (i.e., beauty advisor 102) of the handheld makeup applicator device 101 and/or the user 202 of the handheld makeup applicator device 201.

Moreover, the user device 302 may include one or more processor(s) 314, as well as one or more computer memories 316. Memories 316 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memories 316 may store an operating system (OS) (e.g., iOS, Microsoft Windows, Linux, UNIX, etc.) capable of facilitating the functionalities, apps, methods, or other software as discussed herein. The memories 316 may store instructions that, when executed by the processor(s) 314, cause the processor(s) 314 to receive input from a user (e.g., the beauty advisor user 102 and/or the user 202) as provided via the user interface 308 (e.g., via interactive user interface display screens discussed below with respect to FIGS. 4A-4C), and send the received user input to the respective handheld makeup applicator device 101 and/or the handheld makeup applicator device 201 (e.g., via the network 306), in some cases responsive to a request for such user input from the respective handheld makeup applicator device 101 and/or the handheld makeup applicator device 201. Furthermore, in some examples, the memories 316 may store instructions that, when executed by the processor(s) 314, cause the processor(s) 314 to capture sensor data via one or more sensors 310, in some cases responsive to a request for particular sensor data from the respective handheld makeup applicator device 101 and/or the handheld makeup applicator device 201, and may send the captured sensor data to the respective handheld makeup applicator device 101 and/or the handheld makeup applicator device 201. Moreover, in some examples, the memories 316 may store instructions that, when executed by the processor(s) 314, cause the processor(s) 314 to provide light to the face of the beauty advisor user 102 or user 202 via a light source 312, in some cases responsive to a request from the respective handheld makeup applicator device 101 and/or the handheld makeup applicator device 201 to provide light to the face of the respective beauty advisor user 102 or user 202. In some examples, the request may include a request for a particular lighting parameters, such as a particular level/intensity of light, or a particular warmth or color of light, and the processor(s) 314 may in turn cause the light source 312 to provide the requested level/intensity, color, warmth, etc. of light to the face of the user.

Furthermore, in some examples, the instructions stored on the memories 238 may cause the processor(s) 314 to perform any or all of the steps of the methods 600 and/or 700 discussed below with respect to FIGS. 6 and 7, respectively.

In some embodiments the server 304 may comprise one or more servers, which may comprise multiple, redundant, or replicated servers as part of a server farm. In still further aspects, such server(s) 304 may be implemented as cloud-based servers, such as a cloud-based computing platform. For example, such server(s) 304 may be any one or more cloud-based platform(s) such as MICROSOFT AZURE, AMAZON AWS, or the like. Such server(s) 304 may include one or more processor(s) 318 (e.g., CPUs) as well as one or more computer memories 320.

The memories 320 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memories 320 may store an operating system (OS) (e.g., Microsoft Windows, Linux, UNIX, etc.) capable of facilitating the functionalities, apps, methods, or other software as discussed herein. The memories 320 may store one or more machine learning models 322, and/or one or more respective machine learning model training applications 324. These machine learning models 322 may include, for instance, a machine learning model trained to analyze data captured by sensors 104 and/or sensors 204 associated with a face of a beauty advisor 102 or another user 202 to identify facial features thereon, a machine learning model trained to analyze sensor data captured by sensors 104 of a handheld makeup applicator device 101 of a beauty advisor 102 as the beauty advisor applies a makeup look in order to generate guidance to be provided by a handheld makeup applicator device 201 of another user 202 to guide the user 202 to replicate or recreate the makeup look of the beauty advisor, etc.

Additionally, or alternatively, the memories 320 may store sensor data captured by the sensors 104 of the handheld makeup applicator device 101 as the beauty advisor 102 applies various makeup looks, and/or guidance generated therefrom. In some embodiments, the sensor data may also be stored in a database 326 (or in multiple such databases) for sensor data associated with various beauty advisor looks. Similarly, in some embodiments, the guidance data associated with the various beauty advisor looks may also be stored in a database 328 (or in multiple such databases). Furthermore, in some embodiments, the data described as being stored in the database 326, and the data described as being stored in the database 328, may be stored in a single database. The databases 326 and/or 328, or other relevant databases, may be accessible or otherwise communicatively coupled to the server 304, or, in some examples, various other devices of the system 300.

Furthermore, the memories 320 may store instructions that, when executed by the processors 318, cause the processors 318 to receive data from various databases such as the databases 326 and 328, and/or data from the handheld makeup applicator device 101, the handheld makeup applicator device 201, and/or the user device 302 (e.g., via the network 306). The data from the handheld makeup applicator device 101, the handheld makeup applicator device 201, and/or the user device 302 may include, for instance, data captured by the sensors 104 of the handheld makeup applicator device 101, data captured by the sensors 204 of the handheld makeup applicator device 201 and/or data captured by the sensors 310 of the user device 302, data input by a user via a user interface of the handheld makeup applicator device 101, data input by a user via a user interface of the handheld makeup applicator device 201, and/or data input by a user via the user interface 308 of the user device 302, etc. The instructions stored on the memories 320, when executed by the processors 318, may cause the processors 318 to analyze data received from the databases 326 and 328, the handheld makeup applicator device 101, the handheld makeup applicator device 201, and/or the user device(s) 302 in order to make an identification or a prediction based on the received data, and subsequently send the identification and/or prediction to the handheld makeup applicator device 101, the handheld makeup applicator device 201, and/or the user device 302. For instance, this analysis and identification and/or prediction may be based upon applying a trained machine learning model 322 to the data received from the databases 326 and 328, the handheld makeup applicator device 101, the handheld makeup applicator device 201, and/or the user device(s) 302.

In some examples, one or more machine learning model(s) 322 may be executed on the server 304, while in other examples one or more machine learning model(s) 322 may be executed on another computing system, separate from the server 304. For instance, the server 304 may send data to another computing system, where a trained machine learning model 322 is applied to the data, and the other computing system may send a prediction or identification, based upon applying the trained machine learning model 322 to the data, to the server 304. Moreover, in some examples, one or more machine learning model(s) 322 may be trained by respective machine learning model training application(s) 324 executing on the server 304, while in other examples, one or more machine learning model(s) 322 may be trained by respective machine learning model training application(s) executing on another computing system, separate from the server 304.

Whether the machine learning model(s) 322 are trained on the server 304 or elsewhere, the machine learning model(s) 322 may be trained by respective machine learning model training application(s) 324 using training data (including historical data in some cases), and the trained machine learning model(s) 322 may then be applied to new/current data that is separate from the training data in order to determine, e.g., predictions and/or identifications related to the new/current data.

For example, a machine learning model 322 trained to analyze data associated with a user's face and/or a three-dimensional map associated with the user's face to identify facial features thereon may be trained by a machine learning model training application 324 using training data including images of various faces and/or three-dimensional maps associated with the various faces, and indications of locations of facial features in the images and/or three-dimensional maps. For instance, each image and/or three-dimensional map may be labeled to indicate locations of facial features such as the eyes, eyelids, eyebrows, eyelashes, cheeks, cheekbones, nose, lips, chin, etc. on the face, and these labeled images and/or three-dimensional maps may be used as training data. Once sufficiently trained using this training data, such a machine learning model 322 may be applied to a new image, video, and/or three-dimensional map associated with a user's face (e.g., an image or video captured by the sensors 204, 310, etc., in real-time), and may identify likely locations of various facial features of the user's face.

As another example, a machine learning model 322 may be trained to analyze sensor data captured by sensors 104 of a handheld makeup applicator device 101 of a beauty advisor 102 as the beauty advisor applies a makeup look, in order to generate guidance to be provided by a handheld makeup applicator device 201 of another user 202 to guide the user 202 to replicate or recreate the makeup look of the beauty advisor 102. This example machine learning model 322 may be trained by a machine learning model training application 324 using training data including sensor data captured by handheld makeup applicator devices of various individuals as the various individuals apply makeup looks. In particular, the training data may include sensor data captured by handheld makeup applicator devices of various individuals having different face shapes, skin textures, ages, genders, skin oiliness/dryness, skin tones, or other face/skin characteristics as they successfully apply the same makeup look (for various different makeup looks). For instance, the sensor data may be labeled with the face/skin characteristics of each individual and the makeup look being applied by each individual and this labeled sensor data may be used as training data. Once sufficiently trained using this training data, such a machine learning model 322 may be applied to sensor data captured by sensors 104 of a handheld makeup applicator device 101 as a beauty advisor 102 applies a makeup look, and sensor data captured by sensors 204 of a handheld makeup applicator device 201 as another user 202 attempts to apply the same makeup look. The trained machine learning model 322 to may determine how the face/skin characteristics of the beauty advisor 102 differ from the face/skin characteristics of the user 202 based on the sensor data from the sensors 104 and 204, and may further determine expected sensor data from the sensors 204 that would be associated with a successful application of the makeup look of the beauty advisor 102 by the individual 202 using the handheld makeup applicator device 201. The guidance may then be generated by comparing the expected sensor data from the sensors 204 to the actual sensor data received from the sensor 204 as the user 202 attempts to apply the makeup look of the beauty advisor 102, and providing feedback to the user 202 to make various adjustments until the actual sensor data captured by the sensors 204 matches (or more closely matches) the expected sensor data.

In various aspects, the machine learning model(s) 322 may comprise machine learning programs or algorithms that may be trained by and/or employ neural networks, which may include deep learning neural networks, or combined learning modules or programs that learn in one or more features or feature datasets in particular area(s) of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the machine learning model(s) 322 may comprise a library or package executed on the server 304 (or other computing devices not shown in FIG. 3). For example, such libraries may include the TENSORFLOW based library, the PYTORCH library, and/or the SCIKIT-LEARN Python library.

Machine learning may involve identifying and recognizing patterns in existing data (such as training a model based upon historical data) in order to facilitate making predictions or identification for subsequent data (such as using the machine learning model on new/current data order to determine a prediction or identification related to the new/current data).

Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In addition, memories 320 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the computer-readable instructions stored on the memory 320 may include instructions for carrying out any of the steps of the methods 600 or 700 (described in greater detail below with respect to FIG. 6 and, respectively) via an algorithm executing on the processors 318. It should be appreciated that one or more other applications may be envisioned and that are executed by the processor(s) 318. It should be appreciated that given the state of advancements of mobile computing devices, any or all of the processes functions and steps described herein may be present together on a mobile computing device, such as the user device 302, the handheld makeup applicator device 101, the handheld makeup applicator device 201, or any of the other devices described above as being included in the system 300.

Example User Interface Displays

Figure 4C:
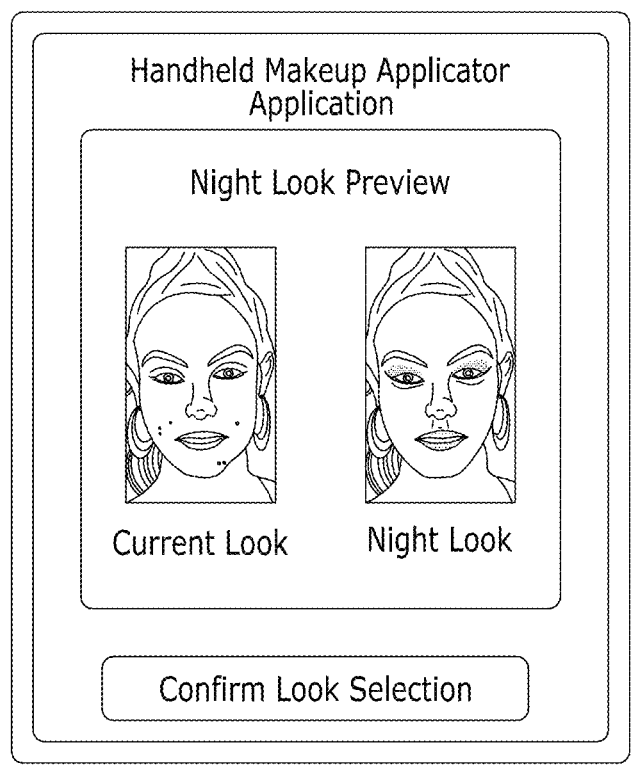

FIGS. 4A-4C depict exemplary user interface displays as may be provided by a user interface of the handheld makeup applicator device 201 and/or of an associated user device (e.g., user device 302). For instance, FIG. 4A illustrates an example user interface display via which a user 202 may select a beauty advisor 102. For instance, the user 202 may select a beauty advisor 102 by name ("Jane Doe," "Mary Smith," etc.), or may select a beauty advisor 102 from a social media platform. Furthermore, as illustrated at FIG. 4B, a user 202 may select a particular makeup look created by the beauty advisor 102, such as "smoky eye," "cat eye," "contour," "day look," "night look," "party look," "work look," etc.

FIG. 4C illustrates an example preview of the look (e.g., "night look") selected by the user at FIG. 4B. In some examples, the preview may show an image of the beauty advisor 102 with the selected look applied (in some cases, both before and after applying the selected look). Moreover, in some examples, the preview may additionally or alternatively include images of other users who have applied the makeup look created by the beauty advisor 102 using their respective handheld makeup applicator devices 201. Furthermore, in some examples, the preview may additionally or alternatively include an image of a generic three-dimensional face with the makeup look applied.

Additionally or alternatively, in some examples, the preview may include an image of the face of the user 202 with a rendering of the selected makeup look created by the beauty advisor 102, as applied to the face of the user 202. For instance, as shown in FIG. 4C, the preview includes a rendering of the user's current look and a rendering of a predicted look including the selected makeup look. Moreover, in some examples, the preview may include an augmented reality (AR) rendering of the selected makeup look overlaid upon an image or video of the face of the user 202 in real-time, or overlaid upon (i.e., projected upon) a mirror reflecting the face of the user 202 in real-time.

As shown in FIG. 4C, the preview includes an option to confirm the selected look. Upon confirming the selected look, the sensor data captured by the handheld makeup applicator device 101 while the beauty advisor 102 originally applied the selected makeup look, or guidance generated therefrom, may sent to the handheld makeup applicator device 201 to be applied to the face of the user 202.

Figure 5:
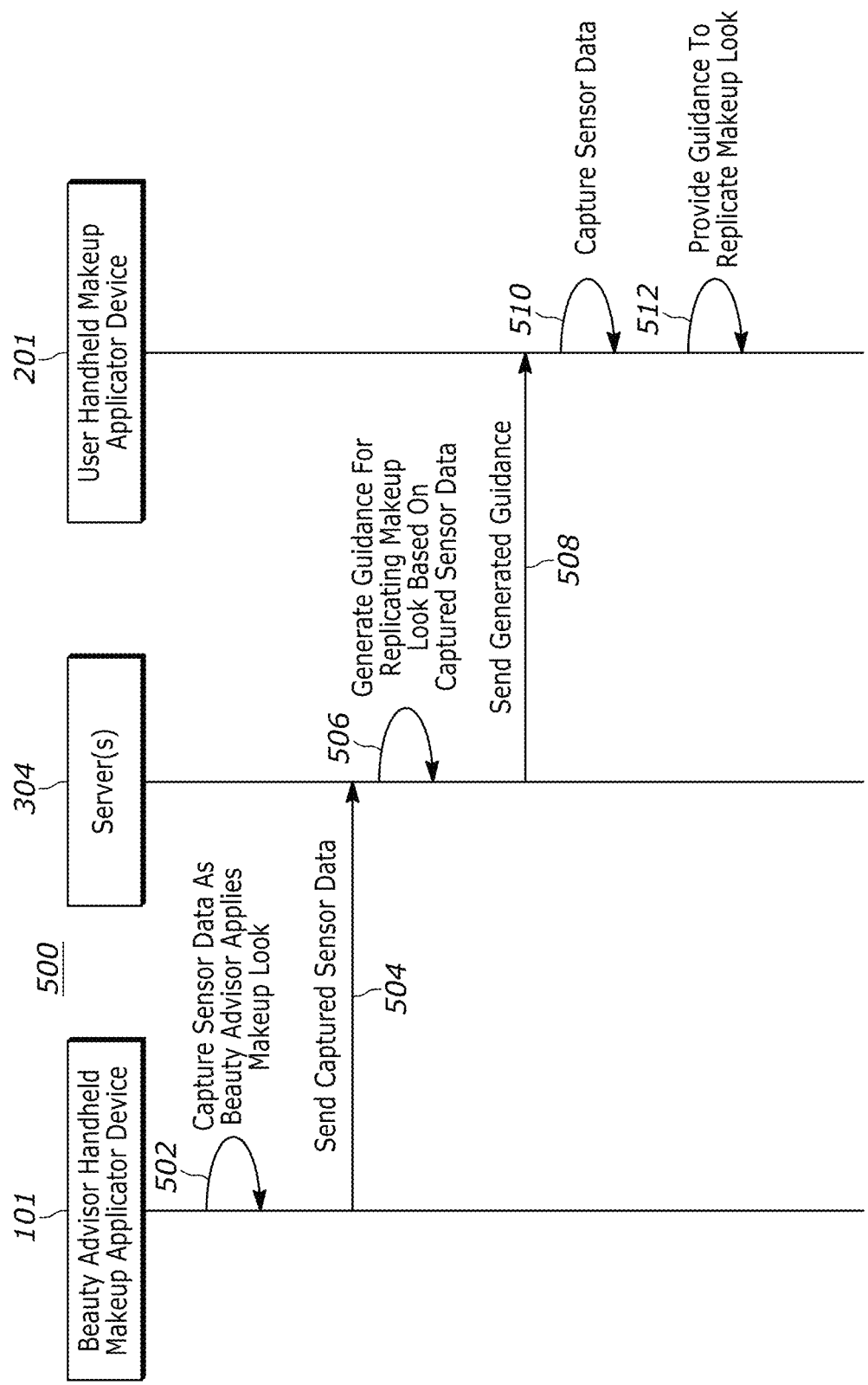
FIG. 5 depicts an example signal diagram for operating one or more handheld makeup applicator devices to allow users to replicate makeup looks created by beauty advisors, according to some embodiments.

Example Signal Diagram Associated with Operating One or More Handheld Makeup Applicator Devices to Allow Users to Replicate Makeup Looks Created by Beauty Advisors FIG. 5 depicts a signal diagram 500 associated with operating one or more handheld makeup applicator devices to allow users to replicate makeup looks created by beauty advisors. The signal diagram 500 illustrates example communications between a handheld makeup applicator device 101 associated with a beauty advisor 102, one or more servers 304, and a handheld makeup applicator device 201 associated with another user 202. In some examples, another device such as the user device 302, or any other device discussed with respect to FIG. 3 may perform the actions described here as being performed by the server 304.

The handheld makeup applicator device 101 may capture (502) sensor data as the beauty advisor 102 applies a makeup look using the handheld makeup applicator device 101. The handheld makeup applicator device 101 may send (504) the captured sensor data to one or more servers 304. The one or more servers 304 may analyze the captured sensor data to generate (506) guidance for replicating a makeup look based on the captured sensor data. In some examples, either the handheld makeup applicator device 101 or the handheld makeup applicator device 201 may generate some or all of the guidance, e.g., in addition to or as an alternative to the one or more servers 304 generating some or all of the guidance. The one or more servers may send (508) the generated guidance to the handheld makeup applicator device 201 associated with the user 202. In some examples, the handheld makeup applicator device 101 may send the sensor data, and/or the guidance generated therefrom, directly to the handheld makeup applicator device 201. The handheld makeup applicator device 201 may capture (510) its own sensor data and may then provide (510) guidance to the user 202 to allow the user 202 to replicate the makeup look of the beauty advisor. The guidance may be based on both the sensor data captured by the handheld makeup applicator device 101 (and/or guidance generated therefrom) and the sensor data captured by the handheld makeup applicator device 201. Providing the guidance to the user 202 may include, for instance, controlling one or more actuators 206 to adjust one or more adjustable components 208 of the handheld makeup applicator device 201, providing audio guidance via an audio interface 210, providing visual guidance via a user interface 212, or some combination of these, in various embodiments.

Figure 6:
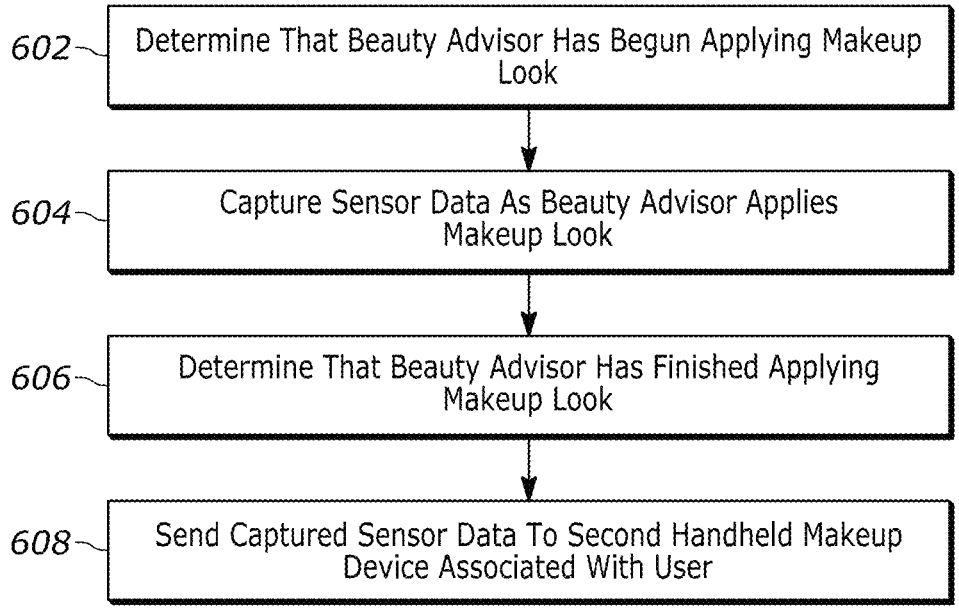
FIG. 6 depicts an example flow diagram for operating a handheld makeup applicator device used by a beauty advisor and configured to capture sensor data as the beauty advisor applies a makeup look, according to some embodiments.

Example Method for Operating a Handheld Makeup Applicator Device Used by a Beauty Advisor and Configured to Capture Sensor Data as the Beauty Advisor Applies a Makeup Look FIG. 6 depicts a flow diagram of an exemplary computer-implemented method 600 for exemplary handheld makeup applicator device 101 used by a beauty advisor 102 and configured to capture sensor data as the beauty advisor 102, according to one embodiment. One or more steps of the method 600 may be implemented as a set of instructions stored on a computer-readable memory (e.g., memory 112, memory 316, memory 320, etc.) and executable on one or more processors (e.g., processor 110, processor 314, processor 318, etc.).

The method 600 may include determining (block 602) that a beauty advisor 102 has begun applying a makeup look using a handheld makeup applicator device 101. For instance, this determination may be based on user input via a user interface of the handheld makeup applicator device 101 (e.g., a selection made via a touchscreen) or a user interface of an associated user device, which may include verbal/audio input (e.g., user vocalizations) in some examples. Moreover, in some examples, this determination may be based on actions of the user as determined by analyzing the sensor data. For instance, sensor data indicative of motion of the handheld makeup applicator device 101 after a period of motionlessness, may indicate that the beauty advisor 102 has begun applying the makeup look, or may begin applying the makeup look soon.

Additionally, the method 600 may include capturing (block 604) sensor data as the beauty advisor 102 applies the makeup look using the handheld makeup applicator device 101, e.g., using the sensors 104. For instance, this sensor data may include sensor data representative of movements of the handheld makeup applicator device during the application of the makeup look by the beauty advisor, sensor data representative of locations of the handheld makeup applicator device with respect to a face of the beauty advisor user during the application of the makeup look, etc. In some examples, the sensors may include one or more image sensors, which may be configured to capture sensor data representative of a face of the beauty advisor user during the application of the makeup look, or capture sensor data representative of one or more cosmetic products applied to a face of the beauty advisor user during the application of the makeup look.

Furthermore, the method 600 may include determining (block 608) that the beauty advisor 102 has finished applying the makeup look using the handheld makeup applicator device 101. For instance, this determination may be based on user input via a user interface of the handheld makeup applicator device (e.g., a selection made via a touchscreen) or a user interface of an associated user device, which may include verbal/audio input in some examples. Moreover, in some examples, this determination may be based on actions of the user as determined by analyzing the sensor data. For instance, sensor data indicative of the handheld makeup applicator device being set down, being motionless, etc. for a threshold period of time, may indicate that the beauty advisor 102 has finished applying the makeup look.

For instance, the method 600 may include starting to capture sensor data upon determining that the beauty advisor has begun or is about to begin applying the makeup look and/or a particular step of the makeup look, and ceasing capturing sensor data upon determining that the beauty advisor has finished applying the makeup look, or the particular step of the makeup look, using the handheld makeup applicator device 101. In other examples, the method 600 may include continuously or periodically capturing some level of sensor data, but increasing the amount, frequency, or types of data collected while the beauty advisor applies the makeup look. Additionally, in other examples, the method 600 may include continuously or periodically capturing some level of sensor data, but only storing the sensor data that is captured during the application of the makeup look.

Moreover, the method 600 may include storing the sensor data in association with a particular makeup look (e.g., storing a first set of sensor data captured while the beauty advisor 102 applies a first makeup look using the handheld makeup applicator device 101, and storing a second set of sensor data captured while the beauty advisor applies a second makeup look using the handheld makeup applicator device 101, and/or storing a first set of sensor data captured while the beauty advisor applies a first step of a makeup look using the handheld makeup applicator device 101, and storing a second set of sensor data captured while the beauty advisor 102 applies a second step of the makeup look using the handheld makeup applicator device 101).

Moreover, the method 600 may include sending the captured sensor data to a second handheld makeup applicator device 201 associated with another user 202. In some examples, the method 600 may include sending the captured sensor data directly from the handheld makeup applicator device 101 to the handheld makeup applicator device 201), e.g., via the network 306 and/or via a short-range signal such as a BLUETOOTH signal. Additionally, in some examples, the method 600 may include sending the captured sensor data to another intermediary device, such as a user device 302 and/or server 304, which may in turn send the captured sensor data (and/or guidance generated therefrom) to the second handheld makeup applicator device 201.

Figure 7:
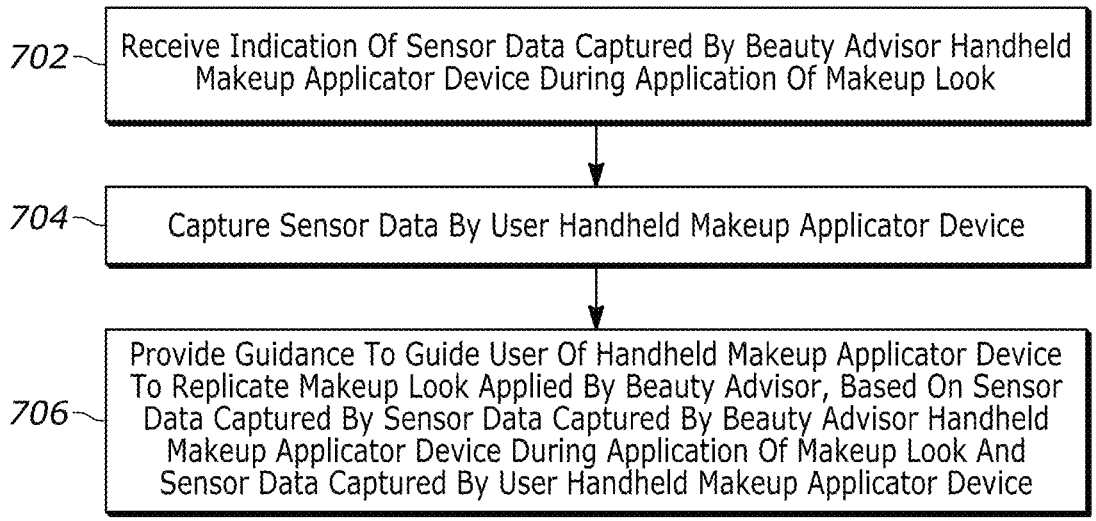
FIG. 7 depicts an example flow diagram for operating a handheld makeup applicator device configured to provide guidance to a user to replicate the makeup look created by a beauty advisor, according to some embodiments.

Example Method for Operating a Handheld Makeup Applicator Device Configured to Provide Guidance to a User to Replicate the Makeup Look Created by a Beauty Advisor, According to Some Embodiments FIG. 7 depicts a flow diagram of an exemplary computer-implemented method 700 for operating a handheld makeup applicator device 201 configured to provide guidance to a user 202 to replicate the makeup look created by a beauty advisor 102, according to some embodiments. One or more steps of the method 700 may be implemented as a set of instructions stored on a computer-readable memory (e.g., memory 220, memory 316, memory 320, etc.) and executable on one or more processors (e.g., processor 218, processor 314, processor 318, etc.).

The method 700 may include receiving (702) an indication of sensor data captured by a handheld makeup applicator device 101 during the application of a makeup look by the beauty advisor 102, or guidance generated therefrom. In some examples, the handheld makeup applicator device 201 may receive the sensor data directly from the handheld makeup applicator device 101, e.g., via the network 306 and/or via a short-range signal such as a BLUETOOTH signal. Additionally, in some examples, the handheld makeup applicator device 201 may receive the sensor data (and/or guidance generated therefrom) from an intermediary device, such as a user device 302 and/or a server 304, that received the captured sensor data from the handheld makeup applicator device 101, e.g., via the network 306 and/or via a short-range signal such as a BLUETOOTH signal.

Furthermore, the method 700 may include capturing sensor data as the user 202 of the handheld makeup applicator device 201 attempts to replicate the makeup look from the beauty advisor 102. For instance, this sensor data may include sensor data representative of movements of the handheld makeup applicator device as the user attempts to replicate/recreate the makeup look of the beauty advisor, sensor data representative of locations of the handheld makeup applicator device with respect to a face of the user as the user attempts to replicate/recreate the makeup look of the beauty advisor, etc. In some examples, the sensors may include one or more image sensors, which may be configured to capture sensor data representative of a face of the user as the user attempts to replicate/recreate the makeup look of the beauty advisor, or capture sensor data representative of one or more cosmetic products applied to a face of the user as the user attempts to replicate/recreate the makeup look of the beauty advisor.

Additionally, the method 700 may include providing guidance to the user 202 of the handheld makeup applicator device 201 as to guide the user 202 to replicate the makeup look from the beauty advisor 102, based on both the sensor data captured by the handheld makeup applicator device 101 (or guidance generated therefrom) as the beauty advisor 102 originally applied the makeup look, and the sensor data captured by the handheld makeup applicator device 201 as the user 202 attempts to replicate the makeup look.

For example, providing the guidance may include providing the guidance visually via a user interface 212 of the handheld makeup applicator device 201. For instance, in some examples, the user interface may include an augmented reality or virtual reality component, and the guidance to guide the user of the handheld makeup applicator device to replicate the makeup look may be provided by the augmented reality or virtual reality component of the user interface 212. In some examples, this augmented reality or virtual reality guidance may be provided over images or videos of the user 202 captured in real time, or over the user's face as it appears in a mirror, as the user attempts to replicate the makeup look of the beauty advisor 102.

As another example, providing the guidance may include providing the guidance audibly, via an audio interface 210 of the handheld makeup applicator device 201. Additionally, in some examples, providing the guidance may include sending the guidance to another device such as the user device 302, to be provided audibly and/or visually via a user interface 308 of the user device 302 (including by an augmented reality or virtual reality component of the user interface 308).

Moreover, in some examples, providing the guidance may include controlling actuators 206 to adjust adjustable components 208 of the handheld makeup applicator device 201 to guide the user 202 to replicate the makeup look from the beauty advisor 102. For example, the adjustable components 208 may include one or more haptic components configured to provide haptic feedback to the user 202 of the handheld makeup applicator device 201 to guide the user 202 to replicate the makeup look applied by the beauty advisor 102. Furthermore, in some examples, the adjustable components 208 may include one or more applicator heads configured to automatically adjust to apply one or more cosmetic products to the face of the user 202 to replicate the makeup look applied by the beauty advisor 102.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for operating one or more handheld makeup applicator devices to allow users to replicate makeup looks created by beauty advisors, and/or systems, methods, and/or techniques associated therewith. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Aspects

1. A handheld makeup applicator device, the handheld makeup applicator device comprising: one or more sensors integrated into a housing of the handheld makeup applicator device and operable to capture sensor data during application of a makeup look, using the handheld makeup applicator device, by a user; a communication interface; one or more processors; and one or more non-transitory memories, storing computer-readable instructions that, when executed by the one or more processors, cause the one or more processors to: receive sensor data captured by the one or more sensors during the application of the makeup look by the user; and send, via the communication interface, an indication of the sensor data, captured by the one or more sensors during the application of the makeup look by the user, to a second handheld makeup applicator device associated with a second user.

2. The handheld makeup applicator device of aspect 1, wherein the one or more sensors include one or more sensors configured to capture sensor data representative of movements of the handheld makeup applicator device during the application of the makeup look.

3. The handheld makeup applicator device of any one of aspects 1 or 2, wherein the one or more sensors include one or more sensors configured to capture sensor data representative of locations of the handheld makeup applicator device with respect to a face of the user during the application of the makeup look.

4. The handheld makeup applicator device of any one of aspects 1-3, wherein the one or more sensors include one or more image sensors.

5. The handheld makeup applicator device of aspect 4, wherein the one or more image sensors are configured to capture sensor data representative of a face of the user during the application of the makeup look.

6. The handheld makeup applicator device of any one of aspects 4 or 5, wherein the one or more image sensors are configured to capture sensor data representative of one or more cosmetic products applied to a face of the user during the application of the makeup look.

7. A handheld makeup applicator device associated with a user, the handheld makeup applicator device comprising: a communication interface; one or more adjustable components integrated a housing of the handheld makeup applicator device; one or more actuators configured to adjust the one or more adjustable components; one or more processors;

and one or more non-transitory memories, storing computer-readable instructions that, when executed by the one or more processors, cause the one or more processors to: receive, via the communication interface, from a second handheld makeup applicator device, indications of data captured by a second handheld makeup applicator device during an application of a makeup look by a second user of the second handheld makeup applicator device; and control the one or more actuators to adjust the one or more adjustable components to guide the user of the handheld makeup applicator device to replicate the makeup look applied by the second user of the second handheld makeup applicator device based on the data captured by the second handheld makeup applicator device during the application of the makeup look.

8. The handheld makeup applicator device of aspect 7, wherein the one or more adjustable components include one or more haptic components configured to provide haptic feedback to the user of the handheld makeup applicator device to guide the user of the handheld makeup applicator device to replicate the makeup look applied by the second user of the second handheld makeup applicator device.

9. The handheld makeup applicator device of any one of aspects 7 or 8, wherein the one or more adjustable components include one or more applicator heads configured to adjust to apply one or more cosmetic products to a face of the user to replicate the makeup look applied by the second user of the second handheld makeup applicator device.

10. The handheld makeup applicator device of any one of aspects 7-9, further comprising one or more sensors integrated into the housing of the handheld makeup applicator device, and wherein controlling the one or more actuators to adjust the one or more adjustable components to guide the user of the handheld makeup applicator device to replicate the makeup look applied by the second user of the second handheld makeup applicator device is based at least in part on sensor data captured by the one or more sensors integrated into the housing of the handheld makeup applicator device.

11. The handheld makeup applicator device of aspect 10, wherein the one or more sensors include one or more sensors configured to capture sensor data representative of movements of the handheld makeup applicator device.

12. The handheld makeup applicator device of any one of aspects 10 or 11, wherein the one or more sensors include one or more sensors configured to capture sensor data representative of locations of the handheld makeup applicator device with respect to a face of the user.

13. The handheld makeup applicator device of any one of aspects 10-12, wherein the one or more sensors include one or more image sensors.

14. The handheld makeup applicator device of aspect 13, wherein the one or more image sensors are configured to capture sensor data representative of a face of the user.

15. The handheld makeup applicator device of any one of aspects 13 or 14, wherein the one or more image sensors are configured to capture sensor data representative of one or more cosmetic products.

16. A system, comprising: a first handheld makeup applicator device associated with a first user, the first handheld makeup applicator device comprising: one or more sensors integrated into a first housing of the first handheld makeup applicator device and operable to capture sensor data during application of a makeup look, using the first handheld makeup applicator device, by the first user; a first communication interface; a first set of one or more processors; and a first set of one or more non-transitory memories, storing a first set of computer-readable instructions that, when executed by the first set of one or more processors, cause the first set of one or more processors to: receive sensor data captured by the one or more sensors during the application of the makeup look; and send, via the first communication interface, an indication of the sensor data captured by the one or more sensors during the application of the makeup look to a second handheld makeup applicator device associated with a second user; and a second handheld makeup applicator device associated with a second user, the second handheld makeup applicator device comprising: a second communication interface; one or more adjustable components integrated into a second housing of the second handheld makeup applicator device; one or more actuators configured to adjust the one or more adjustable components; a second set of one or more processors; and a second set of one or more non-transitory memories, storing a second set of computer-readable instructions that, when executed by the second set of one or more processors, cause the second set of one or more processors to: receive, via the second communication interface, from the first handheld makeup applicator device, indications of the sensor data captured by the one or more sensors during the application of the makeup look; and control the one or more actuators to adjust the one or more adjustable components to guide the second user to replicate the makeup look applied by the first user of the first handheld makeup applicator device based on the sensor data captured by the one or more sensors of the first handheld makeup applicator device during the application of the makeup look.

17. The system of aspect 16, wherein the one or more sensors include one or more sensors configured to capture sensor data representative of movements of the first handheld makeup applicator device during the application of the makeup look.

18. The system of any one of aspects 16 or 17, wherein the one or more sensors include one or more sensors configured to capture sensor data representative of locations of the first handheld makeup applicator device with respect to the face of the first user during the application of the makeup look.

19. The system of any one of aspects 16-18, wherein the one or more adjustable components include one or more haptic components configured to provide haptic feedback to the second user of the second handheld makeup applicator device to guide the second user of the second handheld makeup applicator device to replicate the makeup look applied by the first user of the first handheld makeup applicator device.

20. The system of any one of aspects 16-19, wherein the one or more adjustable components include one or more applicator heads configured to adjust to apply one or more cosmetic products to the face of the second user to replicate the makeup look applied by the first user of the first handheld makeup applicator device.

21. A handheld makeup applicator device associated with a user, the handheld makeup applicator device comprising: a communication interface; one or more sensors integrated into a housing of the handheld makeup applicator device; a user interface; one or more processors; and one or more non-transitory memories, storing computer-readable instructions that, when executed by the one or more processors, cause the one or more processors to: receive, via the communication interface, indications of data captured by a second handheld makeup applicator device during an application of a makeup look by a second user of the second handheld makeup applicator device; and provide, via the user interface, guidance to guide the user of the handheld makeup applicator device to replicate the makeup look applied by the second user of the second handheld makeup applicator device based on the data captured by the second handheld makeup applicator device during the application of the makeup look, and based on sensor data captured by the one or more sensors of the handheld makeup applicator device.

22. The handheld makeup applicator device of aspect 21, wherein the one or more sensors include one or more sensors configured to capture sensor data representative of movements of the handheld makeup applicator device.

23. The handheld makeup applicator device of any one of aspects 21-22, wherein the one or more sensors include one or more sensors configured to capture sensor data representative of locations of the handheld makeup applicator device with respect to a face of the user.

24. The handheld makeup applicator device of any one of aspects 21-23, wherein the one or more sensors include one or more image sensors.

25. The handheld makeup applicator device of aspect 24, wherein the one or more image sensors are configured to capture sensor data representative of a face of the user.

26. The handheld makeup applicator device of any one of aspects 24-25, wherein the one or more image sensors are configured to capture sensor data representative of one or more cosmetic products.

27. The handheld makeup applicator device of any one of aspects 21-26, wherein the user interface is integrated into the handheld makeup applicator device.

28. The handheld makeup applicator device of any one of aspects 21-26, wherein the user interface is integrated into another device, separate from the handheld makeup applicator device.

29. The handheld makeup applicator device of any one of aspects 21-28, wherein the user interface further includes an augmented reality (AR) component, and wherein the guidance to guide the user of the handheld makeup applicator device to replicate the makeup look is provided by the AR component.

30. The handheld makeup applicator device of aspect 29, wherein the guidance provided by the AR component is provided as an overlay upon an image of the user.

31. The handheld makeup applicator device of aspect 29, wherein the guidance provided by the AR component is provided as an overlay upon a video of the user captured in real-time as the user attempts to replicate the makeup look using the handheld makeup applicator device.

32. The handheld makeup applicator device of aspect 29, wherein the guidance provided by the AR component is provided as an overlay upon a reflection of the user in a mirror in real-time as the user attempts to replicate the makeup look using the handheld makeup applicator device.

33. A system, comprising: a first handheld makeup applicator device associated with a first user, the first handheld makeup applicator device comprising a first set of one or more sensors integrated into a first housing of the first handheld makeup applicator device and operable to capture sensor data during application of a makeup look, using the first handheld makeup applicator device, by the first user; and a second handheld makeup applicator device associated with a second user, the second handheld makeup applicator device comprising: a second set of one or more sensors integrated into a second housing of the second handheld makeup applicator device; and a user interface configured to provide guidance to guide the second user of the second handheld makeup applicator device to replicate the makeup look, based on the sensor data captured by the first set of one or more sensors of the first handheld makeup applicator device during the application of the makeup look by the first user, and based on sensor data captured by the second set of one or more sensors of the second handheld makeup applicator device as the second user attempts to replicate the makeup look.

34. The system of aspect 33, wherein the first set of one or more sensors include one or more sensors configured to capture sensor data representative of movements of the first handheld makeup applicator device during the application of the makeup look.

35. The system of any one of aspects 33-34, wherein the first set of one or more sensors include one or more sensors configured to capture sensor data representative of locations of the first handheld makeup applicator device with respect to a face of the first user during the application of the makeup look.

36. The system of any one of aspects 33-35, wherein the first set of one or more sensors include one or more image sensors.

37. The system of aspect 36, wherein the one or more image sensors are configured to capture sensor data representative of a face of the first user during the application of the makeup look.

38. The system of any one of aspects 36-37, wherein the one or more image sensors are configured to capture sensor data representative of one or more cosmetic products applied to a face of the first user during the application of the makeup look.

39. The system of any one of aspects 36-38, wherein the sensor data representative of the one or more cosmetic products, applied to a face of the first user during the application of the makeup look, includes sensor data representative of packaging of the one or more cosmetic products.

40. The system of aspect 33, wherein the user interface further includes an augmented reality (AR) component, and wherein the guidance to guide the second user of the second handheld makeup applicator device to replicate the makeup look is provided by the AR component.

41. A handheld makeup applicator device associated with a user, the handheld makeup applicator device comprising: a communication interface; one or more sensors integrated into a housing of the handheld makeup applicator device; an audio interface; one or more processors; and one or more non-transitory memories, storing computer-readable instructions that, when executed by the one or more processors, cause the one or more processors to: receive, via the communication interface, indications of data captured by a second handheld makeup applicator device during an application of a makeup look by a second user of the second handheld makeup applicator device; and provide, via the audio interface, audio guidance to guide the user of the handheld makeup applicator device to replicate the makeup look applied by the second user of the second handheld makeup applicator device based on the data captured by the second handheld makeup applicator device during the application of the makeup look, and based on sensor data captured by the one or more sensors of the handheld makeup applicator device.

42. The handheld makeup applicator device of aspect 41, wherein the one or more sensors include one or more audio sensors configured to capture data representative of vocalizations by the user of the handheld makeup applicator device.

43. The handheld makeup applicator device of aspect 42, wherein the audio guidance includes two or more audio guidance steps, and wherein providing each subsequent audio guidance step is provided based on the data representative of vocalizations by the user of the handheld makeup applicator device.

44. The handheld makeup applicator device of any one of aspects 41-43, wherein the one or more sensors include one or more sensors configured to capture sensor data representative of movements of the handheld makeup applicator device.

45. The handheld makeup applicator device of any one of aspects 41-44, wherein the one or more sensors include one or more sensors configured to capture sensor data representative of locations of the handheld makeup applicator device with respect to a face of the user.

46. The handheld makeup applicator device of any one of aspects 41-45, wherein the one or more sensors include one or more image sensors.

47. The handheld makeup applicator device of aspect 46, wherein the one or more image sensors are configured to capture sensor data representative of a face of the user.

48. The handheld makeup applicator device of any one of aspects 46-47, wherein the one or more image sensors are configured to capture sensor data representative of one or more cosmetic products.

49. The handheld makeup applicator device of any one of aspects 41-48, wherein the audio interface is integrated into the handheld makeup applicator device.

50. The handheld makeup applicator device of any one of aspects 41-48, wherein the audio interface is integrated into another device, separate from the handheld makeup applicator device.

51. A system, comprising: a first handheld makeup applicator device associated with a first user, the first handheld makeup applicator device comprising a first set of one or more sensors integrated into a first housing of the first handheld makeup applicator device and operable to capture sensor data during application of a makeup look, using the first handheld makeup applicator device, by the first user; and a second handheld makeup applicator device associated with a second user, the second handheld makeup applicator device comprising: a second set of one or more sensors integrated into a second housing of the second handheld makeup applicator device; and an audio interface configured to provide audio guidance to guide the second user of the second handheld makeup applicator device to replicate the makeup look, based on the sensor data captured by the first set of one or more sensors of the first handheld makeup applicator device during the application of the makeup look by the first user, and based on sensor data captured by the second set of one or more sensors of the second handheld makeup applicator device as the second user attempts to replicate the makeup look.

52. The system of aspect 51, wherein the second set of one or more sensors include one or more audio sensors configured to capture data representative of vocalizations by the user of the handheld makeup applicator device.

53. The system of aspect 52, wherein the audio guidance includes two or more audio guidance steps, and wherein providing each subsequent audio guidance step is provided based on the data representative of vocalizations by the user of the handheld makeup applicator device.

54. The system of any one of aspects 51-53, wherein the first set of one or more sensors include one or more sensors configured to capture sensor data representative of movements of the first handheld makeup applicator device during the application of the makeup look.

55. The system of any one of aspects 51-54, wherein the first set of one or more sensors include one or more sensors configured to capture sensor data representative of locations of the first handheld makeup applicator device with respect to a face of the first user during the application of the makeup look.

56. The system of any one of aspects 51-55, wherein the first set of one or more sensors include one or more image sensors.

57. The system of aspect 56, wherein the one or more image sensors are configured to capture sensor data representative of a face of the first user during the application of the makeup look.

58. The system of any one of aspects 56-57, wherein the one or more image sensors are configured to capture sensor data representative of one or more cosmetic products applied to a face of the first user during the application of the makeup look.

59. The system of aspect 58, wherein the sensor data representative of the one or more cosmetic products, applied to a face of the first user during the application of the makeup look, includes sensor data representative of packaging of the one or more cosmetic products.

60. A computer-implemented method executed by one or more processors of a handheld makeup applicator device associated with a user, the computer-implemented method comprising operations including: receiving indications of sensor data captured by one or more sensors of the handheld makeup applicator device; receiving indications of data captured by a second handheld makeup applicator device during an application of a makeup look by a second user of the second handheld makeup applicator device; and providing audio guidance to guide the user of the handheld makeup applicator device to replicate the makeup look applied by the second user of the second handheld makeup applicator device based on the data captured by the second handheld makeup applicator device during the application of the makeup look, and based on the sensor data captured by the one or more sensors of the handheld makeup applicator device as the user attempts to replicate the makeup look.

What is claimed is:

1. A first handheld makeup applicator device associated with a first user, the first handheld makeup applicator device comprising:
   a communication interface;
   one or more sensors integrated into a housing of the first handheld makeup applicator device;
   a first user interface;
   one or more processors; and
   one or more non-transitory memories, storing computer-readable instructions that, when executed by the one or more processors, cause the one or more processors to:
   receive, via the communication interface, indications of data captured by a second handheld makeup applicator device associated with a second user during an application of a makeup look by the second user using the second handheld makeup applicator device; and
   provide, via the first user interface, guidance to guide the first user of the first handheld makeup applicator device to replicate the makeup look applied by the second user of the second handheld makeup applicator device based on the data captured by the second handheld makeup applicator device during the application of the makeup look, and based on sensor data captured by the one or more sensors of the first handheld makeup applicator device.

2. The first handheld makeup applicator device of claim 1, wherein the one or more sensors include one or more sensors configured to capture sensor data representative of movements of the first handheld makeup applicator device.

3. The first handheld makeup applicator device of claim 1, wherein the one or more sensors include one or more sensors configured to capture sensor data representative of locations of the first handheld makeup applicator device with respect to a face of the first user.

4. The first handheld makeup applicator device of claim 1, wherein the one or more sensors include one or more image sensors.

5. The first handheld makeup applicator device of claim 4, wherein the one or more image sensors are configured to capture sensor data representative of a face of the first user.

6. The first handheld makeup applicator device of claim 4, wherein the one or more image sensors are configured to capture sensor data representative of one or more cosmetic products.

7. The first handheld makeup applicator device of claim 1, wherein the first user interface is integrated into the first handheld makeup applicator device.

8. The first handheld makeup applicator device of claim 1, wherein the first user interface is integrated into another device, separate from the first handheld makeup applicator device.

9. The first handheld makeup applicator device of claim 1, wherein the first user interface further includes an augmented reality (AR) component, and wherein the guidance to guide the first user of the first handheld makeup applicator device to replicate the makeup look is provided by the AR component.

10. The first handheld makeup applicator device of claim 9, wherein the guidance provided by the AR component is provided as an overlay upon an image of the first user.

11. The first handheld makeup applicator device of claim 9, wherein the guidance provided by the AR component is provided as an overlay upon a video of the first user captured in real-time as the first user attempts to replicate the makeup look using the first handheld makeup applicator device.

12. The first handheld makeup applicator device of claim 11, wherein the guidance provided by the AR component is provided as an overlay upon a reflection of the first user in a mirror in real-time as the first user attempts to replicate the makeup look using the first handheld makeup applicator device.

13. A system, comprising:
a first handheld makeup applicator device associated with a first user, the first handheld makeup applicator device comprising a first set of one or more sensors integrated into a first housing of the first handheld makeup applicator device and operable to capture sensor data during application of a makeup look, using the first handheld makeup applicator device, by the first user; and
a second handheld makeup applicator device associated with a second user, the second handheld makeup applicator device comprising:
a second set of one or more sensors integrated into a second housing of the second handheld makeup applicator device; and
a user interface configured to provide guidance to guide the second user of the second handheld makeup applicator device to replicate the makeup look, based on the sensor data captured by the first set of one or more sensors of the first handheld makeup applicator device during the application of the makeup look by the first user, and based on sensor data captured by the second set of one or more sensors of the second handheld makeup applicator device as the second user attempts to replicate the makeup look.

14. The system of claim 13, wherein the first set of one or more sensors include one or more sensors configured to capture sensor data representative of movements of the first handheld makeup applicator device during the application of the makeup look.

15. The system of claim 13, wherein the first set of one or more sensors include one or more sensors configured to capture sensor data representative of locations of the first handheld makeup applicator device with respect to a face of the first user during the application of the makeup look.

16. The system of claim 13, wherein the first set of one or more sensors include one or more image sensors.

17. The system of claim 16, wherein the one or more image sensors are configured to capture sensor data representative of a face of the first user during the application of the makeup look.

18. The system of claim 16, wherein the one or more image sensors are configured to capture sensor data representative of one or more cosmetic products applied to a face of the first user during the application of the makeup look.

19. The system of claim 18, wherein the sensor data representative of the one or more cosmetic products, applied to a face of the first user during the application of the makeup look, includes sensor data representative of packaging of the one or more cosmetic products.

20. The system of claim 13, wherein the user interface further includes an augmented reality (AR) component, and wherein the guidance to guide the second user of the second handheld makeup applicator device to replicate the makeup look is provided by the AR component.

* * * * *